(12) United States Patent
Huang et al.

(10) Patent No.: US 12,179,239 B2
(45) Date of Patent: Dec. 31, 2024

(54) CLEANING SYSTEM, AND METHOD

(71) Applicant: SUZHOU SUNWELL NEW ENERGY CO., LTD., Jiangs (CN)

(72) Inventors: Yong Huang, Jiangsu (CN); Yu Yao, Jiangsu (CN); Yanjie Li, Jiangsu (CN)

(73) Assignee: Suzhou Sunwell New Energy Co., Ltd., Suzhou (CN)

( * ) Notice: Subject to any disclaimer, the term of this patent is extended or adjusted under 35 U.S.C. 154(b) by 0 days.

(21) Appl. No.: 18/437,026

(22) Filed: Feb. 8, 2024

(65) Prior Publication Data

US 2024/0286175 A1    Aug. 29, 2024

Related U.S. Application Data

(63) Continuation of application No. PCT/CN2023/088100, filed on Apr. 13, 2023.

(30) Foreign Application Priority Data

Feb. 28, 2023    (CN) .......................... 202310179661.4

(51) Int. Cl.
*B08B 9/093*   (2006.01)
*B01D 35/16*   (2006.01)
*B08B 1/16*    (2024.01)
*B08B 3/02*    (2006.01)
*B08B 3/14*    (2006.01)

(52) U.S. Cl.
CPC .............. *B08B 3/14* (2013.01); *B01D 35/16* (2013.01); *B08B 1/16* (2024.01); *B08B 3/02* (2013.01)

(58) Field of Classification Search
None
See application file for complete search history.

(56) References Cited

FOREIGN PATENT DOCUMENTS

| CN | 1470337    |   | 1/2004 |
|----|------------|---|--------|
| CN | 101433784  | * | 5/2009 |
| CN | 105498340 A|   | 4/2016 |
| CN | 205187228  | * | 4/2016 |
| CN | 216533726  | * | 5/2022 |
| CN | 114798569  |   | 7/2022 |

(Continued)

OTHER PUBLICATIONS

Translation of CN218076678 by Hu, published Dec. 20, 2022.*

(Continued)

*Primary Examiner* — Mikhail Kornakov
*Assistant Examiner* — Ryan L Coleman
(74) *Attorney, Agent, or Firm* — Knobbe, Martens, Olson & Bear, LLP

(57) ABSTRACT

A cleaning system and method can include a cleaning device including a soaking tank configured to accommodate cleaner; and a filtering device configured to filter a first substance being a mixture of the cleaner and mask residue in the soaking tank. The filtering device includes a sucking apparatus including an sucking port for sucking the first substance; a spraying apparatus, including a spraying port oriented a region that the sucking port is capable of sucking in a bottom of the soaking tank, the spraying port being configured to spray liquid or gas to flush the bottom of the soaking tank; and a filtering apparatus connected to the sucking apparatus to receive and filter the first substance sucked by the sucking port.

20 Claims, 8 Drawing Sheets

(56) References Cited

FOREIGN PATENT DOCUMENTS

| CN | 217121054 U | | 8/2022 |
|---|---|---|---|
| CN | 217595337 U | | 10/2022 |
| CN | 217733317 U | | 11/2022 |
| CN | 218076678 | * | 12/2022 |
| EP | 0993023 | * | 4/2000 |
| JP | 0521936 | * | 1/1993 |
| KR | 920004823 | * | 7/1992 |
| KR | 20130063144 | | 6/2013 |

OTHER PUBLICATIONS

Translation of CN101433784 by Luo, published May 20, 2009.*
Translation of KR920004823 by Mitani, published Jul. 20, 1992.*
Translation of EP0993023 by Verlinden, published Apr. 12, 2000.*
Translation of JP0521936 by Okamura, published Jan. 29, 1993.*
Translation of CN205187228 by Yang, published Apr. 27, 2016.*
Translation of CN216533726 by Cao, published May 17, 2022.*
International Search Report and Written Opinion in Chinese for International PCT Application No. PCT/CN2023/088100 dated Oct. 25, 2023 in 8 pages.

* cited by examiner

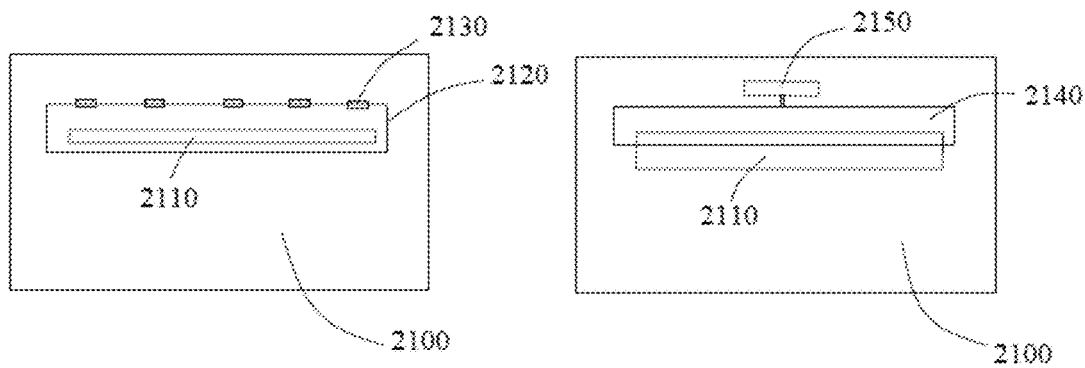
FIG. 3a  FIG. 3b
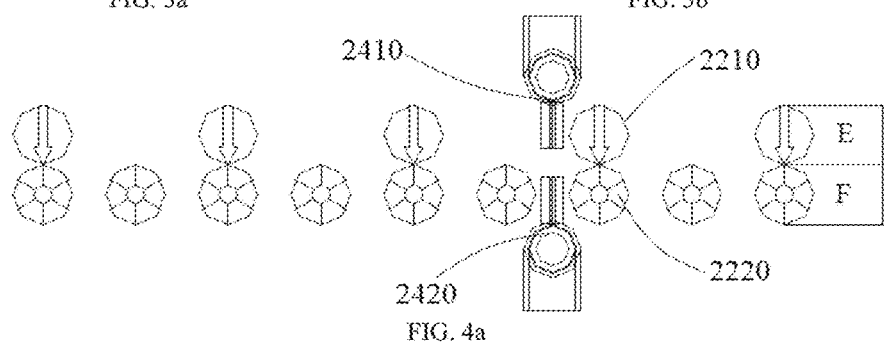
FIG. 4a
FIG. 4b
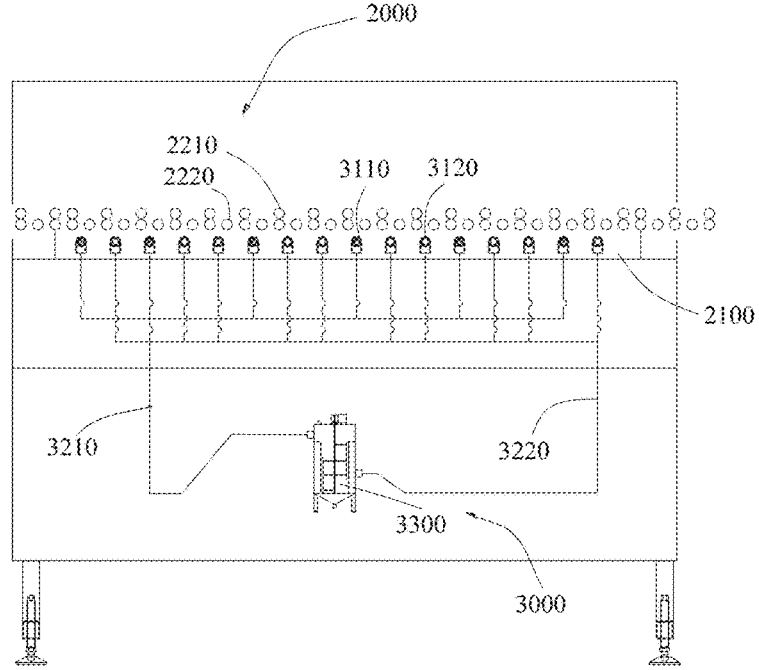
FIG. 5

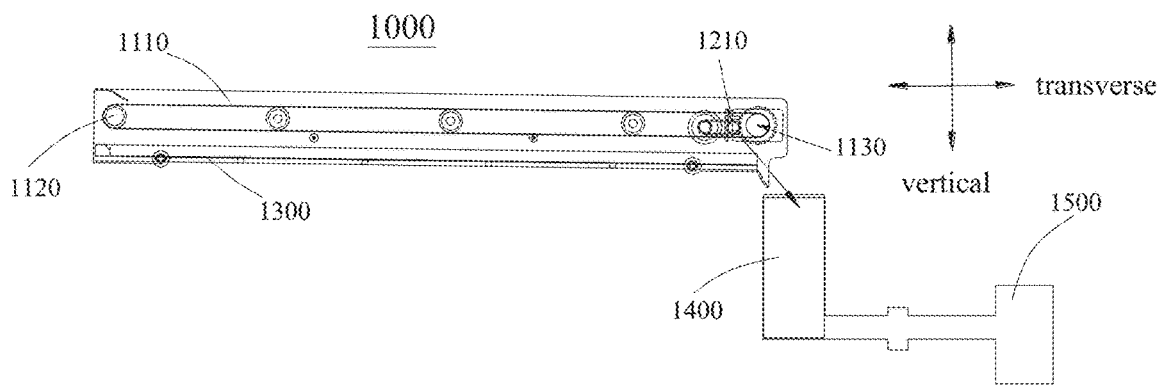
FIG. 13
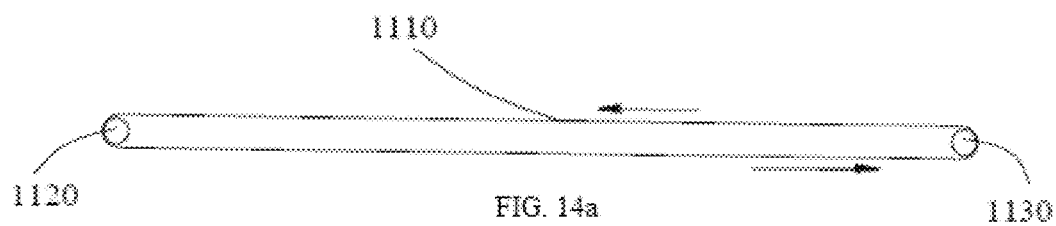
FIG. 14a
FIG. 14b
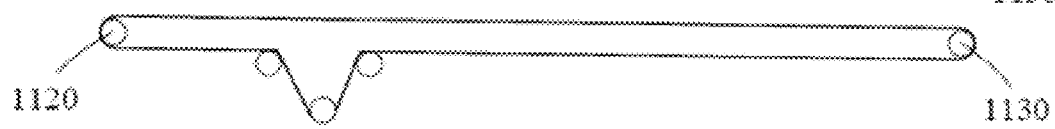
FIG. 14c
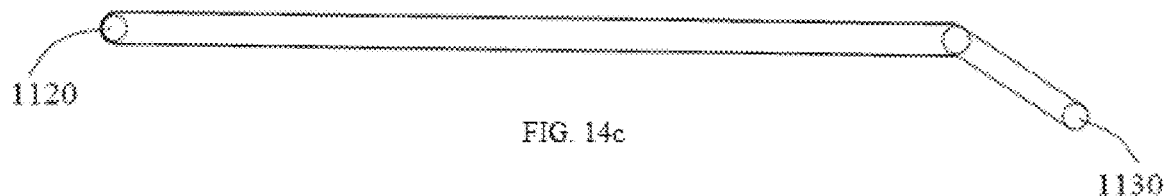
FIG. 15
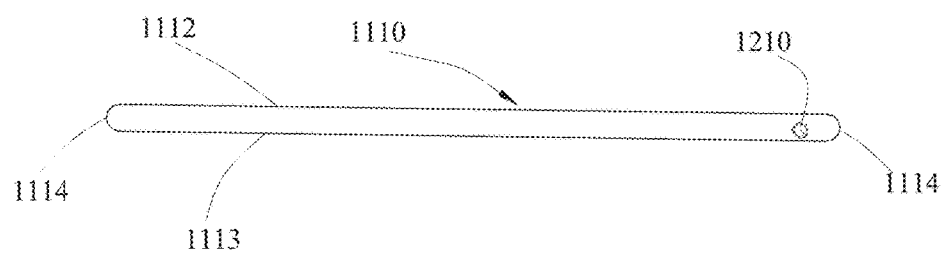
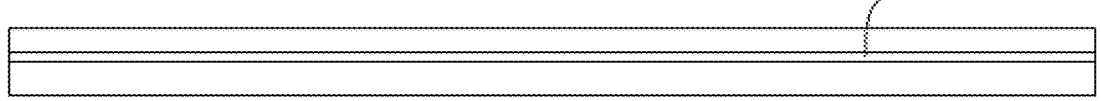
FIG. 16a
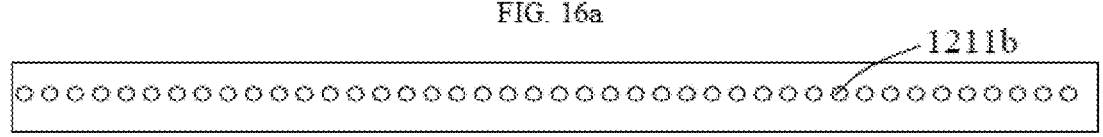
FIG. 16b

CLEANING SYSTEM, AND METHOD

CROSS-REFERENCE TO RELATED APPLICATIONS

The present application claims priority to PCT Application No. PCT/CN2023/088100, filed Apr. 13, 2023, and which claims priority to Chinese Patent Application No. CN2023101796614, filed Feb. 28, 2023, the disclosures of which are incorporated herein by reference in their entireties.

TECHNICAL FIELD

The present disclosure relates to the field of photovoltaic devices, and in particular, to a cleaning system, and method.

BACKGROUND

Depositing metal grid lines on a surface of the solar cell, for example, depositing a copper grid line or a zinc grid line or a laminated grid line of copper and zinc on the surface of the solar cell by electroplating, generally includes, coating the surface of the solar cell with a mask material to form a mask at first, then, forming a mask opening allowing the surface of the solar cell expose on the mask by photolithography or other chemical and physical methods, depositing a metal material in the mask opening to obtain the metal grid line, and finally, removing the mask.

An existing method includes using cleaner to chemically react with the mask to remove the mask from the surface of the solar cell.

In existing mask removal methods, spraying is generally used, which has poor cleaning efficiency and requires long-time spraying, and a mask residue is often attached to the solar cell.

SUMMARY

An objective of the present disclosure relates to a cleaning system, and method, which can efficiently and thoroughly remove a mask on a surface of a solar cell.

A first aspect of the present disclosure provides a cleaning system, including:
  a cleaning device, comprising a soaking tank configured to accommodate cleaner; and
  a filtering device configured to filter a first substance;
  wherein the first substance is a mixture of the cleaner and mask residue in the soaking tank;
  the filtering device comprises:
  a sucking apparatus, comprising an sucking port for sucking the first substance;
  a spraying apparatus, comprising a spraying port, the spraying port being oriented a region that the sucking port is capable of sucking in a bottom of the soaking tank, and the spraying port being configured to spry liquid or gas to flush the bottom of the soaking tank; and
  a filtering apparatus, connected to the sucking apparatus to receive and filter the first substance sucked by the sucking port.

In some embodiments, the mask residue includes or is mainly composed of the residue of the mask on the solar cell.

A second aspect of the present disclosure provides a cleaning method, including:
  step S1: providing a solar cell, the solar cell being a solar cell with a mask attached;
  step S2: immersing the solar cell into cleaner in a soaking tank to remove the mask attached to the solar cell; and
  step S3: spraying liquid or gas towards a bottom of the soaking tank to flush up mask residue deposited on the bottom of the soaking tank and sucking out a first substance that is a mixture of the cleaner and the mask residue in the soaking tank.

Based on the above technical solutions, some embodiments of the present disclosure have the following beneficial effects.

In the cleaning device according to embodiments of the present disclosure, the soaking tank accommodates the cleaner, the conveying roller mechanism are arranged in the soaking tank, the upper and lower conveying roller can move the solar cell transversely, and the liquid level of the soaking tank can maintain higher than the predetermined gap set height, so that the solar cell with the mask attached can be completely immersed in the cleaner. The liquid blocking member of the liquid blocking mechanism is opened when the solar cell passes through the inlet and is closed when no solar cell passes through the inlet, which reduces liquid leakage at the inlet, enabling the cleaner to maintain a liquid level higher than the predetermined gap. The solar cell is immersed in the cleaner, so that the mask on the solar cell can gradually soften and fully react with the cleaner, thereby decomposing and peeling off the mask from the solar cell, which can efficiently and thoroughly remove the mask on the surface of the solar cell.

BRIEF DESCRIPTION OF DRAWINGS

In order to explain the technical solutions of the present disclosure more clearly, the accompanying drawings to be used in embodiments or descriptions of the prior art will be briefly introduced below. Obviously, the accompanying drawings in the following description are only some embodiments of the present disclosure. Those of ordinary skill in the art can also obtain other accompanying drawing according to these accompanying drawings without creative efforts.

FIG. 3a is a structural diagram of a second embodiment of the liquid blocking member according to the present disclosure;

FIG. 3b is a structural diagram of a third embodiment of the liquid blocking member according to the present disclosure;

FIG. 4a is a structural diagram of an embodiment of a conveying roller and a cleaning nozzle according to the present disclosure;

FIG. 4b is a structural diagram of an another embodiment of a conveying roller and a cleaning nozzle according to the present disclosure;

FIG. 5 is a structural diagram of a first embodiment of a cleaning system according to the present disclosure;

FIG. 13 is a structural diagram of a first embodiment of a mask residue separation device according to the present disclosure;

FIG. 14a is a structural diagram of an embodiment of a transmission shaft and a conveyor belt according to the present disclosure;

FIG. 14b is a structural diagram of an another embodiment of a transmission shaft and a conveyor belt according to the present disclosure;

FIG. 14c is a structural diagram of a yet another embodiment of a transmission shaft and a conveyor belt according to the present disclosure;

FIG. 15 is a structural diagram of an embodiment of a conveyor belt and a purger according to the present disclosure;

FIG. 16a is a structural diagram of an embodiment of a purge tube according to the present disclosure;

FIG. 16b is a structural diagram of an another embodiment of a purge tube according to the present disclosure;

REFERENCE SIGNS

Figure 1:
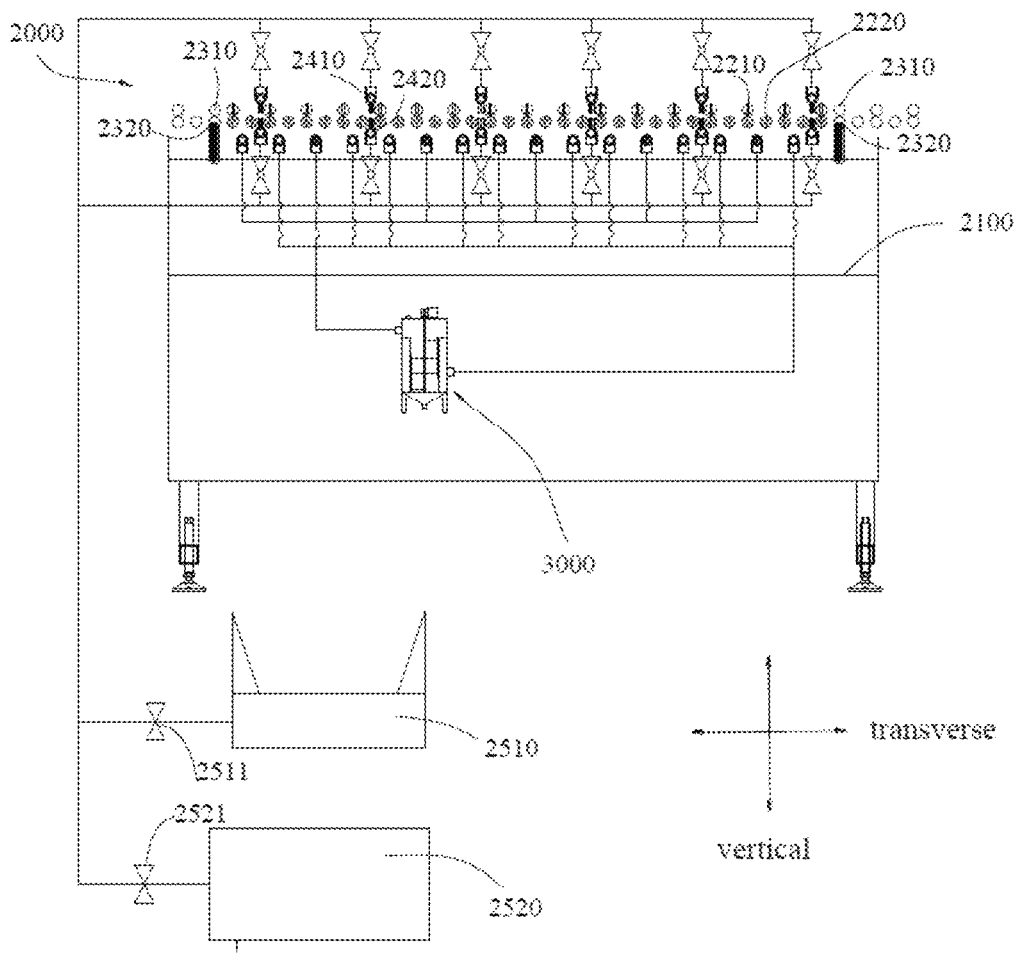
FIG. 1 is a structural diagram of an embodiment of a cleaning device and a filtering device according to the present disclosure.

1000—mask residue separation device; 1110—conveyor belt; 1120—first transmission shaft; 1130—second transmission shaft; 1210—purger; 1211—purge tube; 1220—scraper; 1300—second filter screen; 1400—mask residue collector; 1410—tank body; 1420—pump; 1430—liquid-level sensor; 1500—mask residue dehydrator; 1510—third filter screen; 1521—screw; 1522—spiral blade; 1523—extrusion cavity; 1530—sewage box; 1540—mask residue collection box; 2000—cleaning device; 2100—soaking tank; 2110—inlet; 2120—liquid blocking plate; 2130—hinge; 2140—water shield; 2150—lifting mechanism; 2210—upper conveying roller; 2220—lower conveying roller; 2310—upper liquid-blocking roller; 2320—lower liquid-blocking roller; 2410—upper cleaning nozzle; 2420—lower cleaning nozzle; 2510—first cleaner tank; 2511—first valve; 2520—second cleaner tank; 2521—second valve; 3110—sucking port; 3120—spraying port; 3210—first pipeline; 3220—second pipeline; 3230—third pipeline; 3240—fourth pipeline; 3300—cleaner filter; 3310—barrel body; 3320—barrel cover; 3330—filter element; 3341—rotating shaft; 3342—blade; 3350—driving mechanism; 3361—feed port; 3362—discharge port; 3363—first drain outlet; 3363a—first drain valve; 3364—second drain outlet; 3364a—second drain valve; 3365—exhaust port.

BRIEF DESCRIPTION OF EMBODIMENTS

In order to make those skilled in the art better understand the technical solutions of the present disclosure, the technical solutions in the embodiments of the present disclosure will be described clearly and completely below with reference to the accompanying drawings in the embodiments of the present disclosure. Apparently, the described embodiments are merely some of rather than all of the embodiments of the present disclosure. All other embodiments acquired by those of ordinary skill in the art without creative efforts based on the embodiments in the present disclosure shall fall within the protection scope of the present disclosure.

It is to be noted that the terms such as "first" and "second" used in the specification, claims, and the drawings of the present disclosure are intended to distinguish similar objects, but are not intended to describe a particular order or sequence. It should be understood that numeral used in this manner may be interchangeable where appropriate, so that the embodiments of the present disclosure described herein can be realized in an order in addition to those illustrated or described herein. In addition, the terms "comprise/include", "have", and any other variants thereof mean to cover non-exclusive inclusion.

According to the inventor's analysis, in an existing cleaning device, a mask attached to a solar cell is removed in a manner such as spraying, but it often happens that the mask is not cleaned cleanly, because the mask has strong adhesion to a surface of the solar cell. Moreover, the mask is relatively hard after curing, and the cleaner cannot penetrate into the mask well just by spraying cleaner to the surface of the mask. Besides, the solar cell generally has a thickness of about 100 μm, which is easily broken, and during the spraying of the cleaner, larger spray pressure may cause a worse spraying effect.

Therefore, the embodiments of the present disclosure provide an immersive cleaning method, which means that the solar cell with a mask attached is immersed into the cleaner, so that the mask on the surface of the solar cell do not directly exposure to the oxygen in the air, which enables the mask to gradually soften and fully react with the cleaner, thereby decomposing and peeling off the mask from the solar cell.

A cleaning device 2000 according to an embodiment of the present disclosure is described below.

As shown in FIG. 1, the cleaning device 2000 according to this embodiment of the present disclosure includes: a soaking tank 2100, a conveying roller mechanism, and a liquid blocking mechanism.

Firstly, the soaking tank 2100 and the conveying roller mechanism are described. The soaking tank 2100 is configured to accommodate cleaner, and one transverse end of the soaking tank 2100 is provided with an inlet that allows a solar cell to pass. The conveying roller mechanism is at least partially located in the soaking tank 2100 and includes an upper conveying roller 2210 and a lower conveying roller 2220 arranged up and down, and a predetermined gap is formed between the upper conveying roller 2210 and the lower conveying roller 2220 to enable the solar cell to move through transversely. It is to be noted that the "roller" is a rotatable configuration.

A plane where the solar cell moves in the predetermined gap is a horizontal conveying plane. The predetermined gap matches a thickness of the solar cell. The conveying roller mechanism may include an upper roller and a lower roller. The upper conveying roller 2210 sleeves on an upper roller shaft and the lower conveying roller 2220 sleeves on a lower roller shaft. The upper roller shaft and the lower roller shaft are installed longitudinally at two longitudinal ends of the soaking tank 2100. The lower roller shaft and/or the upper roller shaft are driven by a rotating mechanism to rotate, thereby realizing rotation of the upper roller and/or the lower roller and enabling the solar cell to be conveyed transversely.

The soaking tank 2100 accommodates the cleaner, so that the solar cell with the mask attached can be soaked in the soaking tank 2100 to remove the mask.

The lower conveying roller 2220 can drive the solar cell to move horizontally, so as to pass through the soaking tank 2100. The upper conveying roller 2210 can be separated from the lower conveying roller 2220 by a predetermined gap, and can press down the solar cell to prevent floating of the solar cell, so that the solar cell can be continuously immersed in the cleaner. Moreover, the upper conveying roller 2210 can increase the frictional force between the solar cell and the lower conveying roller 2220.

Next, the liquid blocking mechanism is described. The liquid blocking mechanism fits the inlet, or two liquid blocking mechanisms fit an inlet and an outlet respectively. The liquid blocking mechanism includes an openable and closable liquid blocking member. The liquid blocking member is opened when the solar cell passes through the inlet to allow the solar cell to enter the soaking tank 2100 through the inlet, and is closed when no solar cell passes through the inlet, so as to seal the inlet.

The liquid level of the soaking tank 2100 can maintain higher than the predetermined gap set height, so that the solar cell can be immersed in the cleaner. The height of the cleaner may be higher than the predetermined gap in the following way. A flow velocity of liquid feeding to the soaking tank 2100 is faster than or equal to a flow velocity of liquid leakage at the inlet and the outlet. The flow velocity of liquid leakage can be slow down by arranging the liquid blocking mechanism at the inlet and/or the outlet.

The liquid blocking member is opened when the solar cell passes, and is closed when no solar cell passes. The solar cell can enter the predetermined gap of the conveying roller mechanism through the inlet. That is, the liquid blocking member is opened when the solar cell passes through the inlet, so that the solar cell can pass and enter the predetermined gap of the conveying roller mechanism in the soaking tank 2100, and is closed when no solar cell passes through the inlet, which prevents excessive leakage of the cleaner in the soaking tank 2100, thereby maintaining the liquid level of soaking tank 2100 accommodating the cleaner higher than the predetermined gap set height.

Two liquid blocking mechanisms may be provided. The two liquid blocking mechanisms are arranged at the inlet and the outlet respectively. The liquid blocking member is opened when the solar cell passes through the outlet, and is closed when no solar cell passes through the outlet, which can facilitate the solar cell to enter the soaking tank 2100 and exit the soaking tank 2100 and can prevent excessive leakage of the cleaner in the soaking tank 2100. It is to be noted that the above are merely optional examples. The liquid blocking mechanisms may alternatively be arranged only at the inlet, and the solar cell is directly picked up at the outlet by a mechanical hand or the like, all of which should be understood to be within the scope of the present disclosure.

In the above cleaning device 2000, the soaking tank 2100 accommodates the cleaner, the conveying roller mechanism are arranged in the soaking tank 2100, the upper and lower conveying rollers can move the solar cell transversely, and the liquid level of the soaking tank 2100 can maintain higher than the predetermined gap set height, so that the solar cell with the mask attached in the predetermined gap can be completely immersed in the cleaner. The liquid blocking member of the liquid blocking mechanism is opened when the solar cell passes through the inlet and is closed when no solar cell passes through the inlet, which reduces liquid leakage at the inlet, enabling the cleaner to maintain a liquid level higher than the predetermined gap set height, so that the mask on the solar cell can gradually soften and fully react with the cleaner, thereby decomposing and peeling off the mask from the solar cell. Therefore, the mask on the surface of the solar cell can be efficiently and thoroughly removed.

In some embodiments of the present disclosure, the liquid blocking member includes a liquid-blocking roller mechanism, and the liquid-blocking roller mechanism includes an upper liquid-blocking roller 2310 and a lower liquid-blocking roller 2320 abutting against each other up and down.

Optionally, the upper liquid-blocking roller 2310 is capable of moving up and down and rolling, and/or the lower liquid-blocking roller 2320 is capable of moving up and down and rolling, and the solar cell enters the soaking tank 2100 through abutting portions of the upper liquid-blocking roller 2310 and the lower liquid-blocking roller 2320 which are capable of abutting against each other.

Optionally, the upper liquid-blocking roller is capable of moving up and down, and/or the lower liquid-blocking roller is capable of moving up and down, and the solar cell enters the soaking tank 2100 through abutting portions of the upper liquid-blocking roller and the lower liquid-blocking roller which are capable of abutting against each other.

Figure 2:
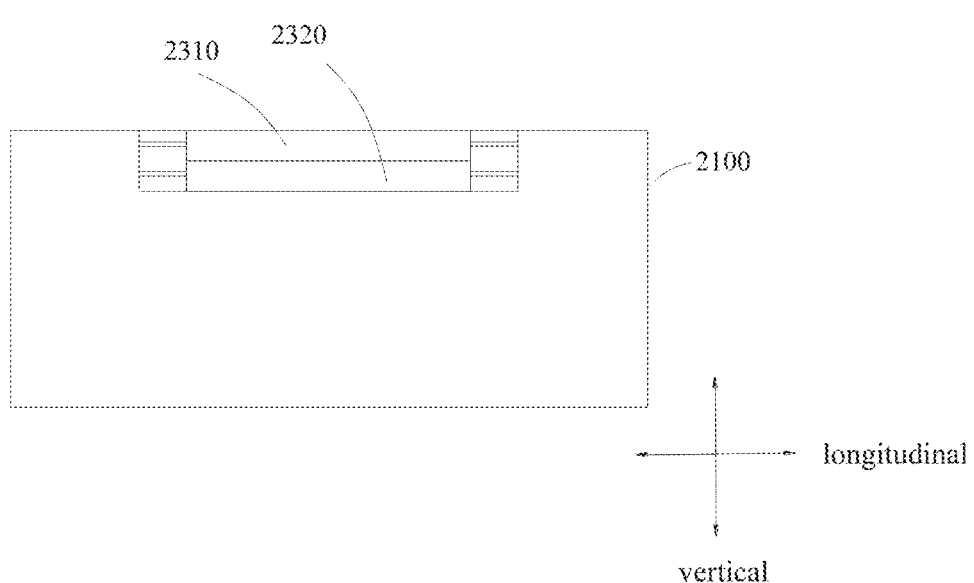
FIG. 2 is a structural diagram of a first embodiment of a liquid blocking member according to the present disclosure.

As shown in FIG. 2, the liquid-blocking roller mechanism may include an upper liquid-blocking shaft and a lower liquid-blocking shaft that are longitudinally arranged on a side wall of the soaking tank 2100, an upper liquid-blocking roller 2310 sleeving on the upper liquid-blocking shaft, and a lower liquid-blocking roller 2320 sleeving on the lower liquid-blocking shaft. The side wall of the soaking tank 2100 may be provided with grooves at two corresponding ends of the upper liquid-blocking shaft to accommodate end portions of the upper liquid-blocking shaft and/or the lower liquid-blocking shaft, so that the upper liquid-blocking shaft can move up and down and roll.

The lower liquid-blocking roller 2320 may abut against side walls at two transverse ends of the soaking tank 2100. The upper liquid-blocking roller 2310 may rely on gravity to press down the lower liquid-blocking roller 2320, or be connected to the lower liquid-blocking roller 2320 through an elastic member (such as a spring), thereby causing the upper liquid-blocking roller 2310 and the lower liquid-blocking roller 2320 to abut against each other. The solar cell gets close to the abutting portions of the two liquid-blocking rollers, and when the solar cell is in contact with the upper roller, the friction between the solar cell and the upper roller will cause the upper liquid-blocking roller 2310 to move upwards while rolling and/or the lower liquid-blocking roller 2320 to move upwards while rolling, thereby opening the upper liquid-blocking roller 2310 and the lower liquid-blocking roller 2320. After the solar cell passes through the abutting portions, the upper liquid-blocking roller 2310 relies on its own gravity to abut against the lower liquid-blocking roller 2320 again, thereby closing the space between the upper liquid-blocking roller 2310 and the lower liquid-blocking roller 2320.

It is to be noted that the upper liquid-blocking roller rolls while moving up and down, and/or the lower liquid-blocking roller rolls while moving up and down, compared with only moving up and down, which can reduce friction of the solar cell (rolling friction of the roller acting on the solar cell is less than sliding friction of the roller acting on the solar cell), thereby preventing damages to the solar cell due to the sliding friction. The upper liquid-blocking roller and/or the lower liquid-blocking roller may not roll while moving up and down, and the inlet is opened and closed only by up and down movement, all of which should be understood to be within the scope of the present disclosure.

The solar cell passing through the abutting portions may be the solar cell being inserted into the abutting portions. The solar cell may be inserted into the abutting portions in a variety of ways. For example, the solar cell may be inserted into the abutting portions manually, or the solar cell may be driven by another upper and lower rollers to be inserted into the abutting portions, or the solar cell may be driven by a conveyor belt to be inserted into the abutting portions.

Optionally, the other transverse end of the soaking tank 2100 is provided with an outlet, and the solar cell enters the soaking tank 2100 from the inlet and exits the soaking tank 2100 from the outlet. The two liquid blocking mechanisms fit the inlet and the outlet respectively.

An upper liquid-blocking roller and a lower liquid-blocking roller are arranged at the outlet. When the solar cell passes through the upper liquid-blocking roller and the lower liquid-blocking roller at the outlet, through the pressing by the upper liquid-blocking roller and the lower liquid-blocking roller, liquid leakage of the soaking tank 2100 can be reduced, and the cleaner attached to the surface of the solar cell can also be removed.

In some embodiments of the present disclosure, the liquid blocking member includes a liquid blocking plate 2120, the liquid blocking plate 2120 is hinged to a side wall of the soaking tank 2100 close to the inlet 2110, the liquid blocking plate 2120 is moved away by the solar cell when the solar cell enters the inlet 2110, such that the solar cell passes through the inlet 2110, and after the solar cell passes, the liquid blocking plate 2120 can return back to block the cleaner from flowing out. Alternatively, the liquid blocking member includes a water shield 2140 liftable and lowerable at the inlet 2110. The water shield 2140 rises to open the inlet when the solar cell passes through the inlet and falls to close the inlet after the solar cell passes through the inlet.

As shown in FIG. 3a, the liquid blocking plate 2120 is hinged to the side wall of the soaking tank 2100 by a hinge 2130. The solar cell push the liquid blocking plate 2120 when it passes through the inlet 2110 and moves the liquid blocking plate 2120 away during its forward movement, so as to enter a roller conveying position of the soaking tank 2100 to open the liquid blocking plate 2120. After the solar cell moves by a certain distance, the liquid blocking plate 2120 covers the inlet 2110 again due to pressure of water, thereby closing the liquid blocking plate 2120. To facilitate the passing of the solar cell, the liquid blocking plate 2120 may be made of a flexible material.

As shown in FIG. 3b, the water shield 2140 is lifted through a lifting mechanism 2150 (a motor or cylinder). The solar cell passes through the inlet 2110, and the lifting mechanism 2150 rises, allowing the solar cell to pass. After the solar cell passes, the water shield 2140 is opened, and the lifting mechanism 2150 is lowered to close the water shield 2140. A sensor may be arranged at the inlet 2110 to sense the solar cell. The lifting mechanism 2150 rises when the sensor senses the solar cell, and descends when the sensor does not sense the solar cell.

In some embodiments of the present disclosure, the cleaning device 2000 includes a plurality of conveying roller mechanisms, each of the conveying roller mechanisms includes a plurality of lower conveying rollers 2220 arranged transversely and two upper conveying rollers 2210, and the two upper conveying rollers 2210 are respectively located directly above two of the plurality of lower conveying rollers 2220 positioned at two transverse ends of the plurality of lower conveying rollers 2220.

As shown in FIG. 4a, each of the conveying roller mechanisms includes three lower conveying rollers 2220 arranged transversely (a first lower roller, a second lower roller, and a third lower roller sequentially arranged) and two upper conveying rollers 2210 (a first upper roller and a second upper roller arranged above the first lower roller and the third lower roller). Decreasing the upper conveying rollers 2210 can increase an area of contact between the solar cell and the cleaner and improve cleaning efficiency, without affecting transverse transfer of the solar cell.

It is to be noted that the above are merely optional examples, and each of the conveying roller mechanisms may alternatively include four (as shown in FIG. 4b) or five lower conveying rollers 2220 arranged transversely and two upper conveying rollers 2210, all of which should be understood to be within the scope of the present disclosure.

In some embodiments of the present disclosure, the cleaning device 2000 further includes a plurality of cleaning nozzle groups, the plurality of cleaning nozzle groups are transversely and interval arranged in transverse spacing between the plurality of conveying roller mechanisms, each of the cleaning nozzle groups includes an upper cleaning nozzle 2410 and a lower cleaning nozzle 2420 arranged up and down relative to each other, the upper cleaning nozzle 2410 is arranged above the predetermined gap and oriented the predetermined gap, the lower cleaning nozzle 2420 is arranged below the predetermined gap and oriented the predetermined gap, and the cleaner is sprayed through the upper cleaning nozzle 2410 and the lower cleaning nozzle 2420.

As shown in FIGS. 4a and 4b, a first spout of the upper cleaning nozzle 2410 and a second spout of the lower cleaning nozzle 2420 are arranged symmetrically. When the solar cell passes between the first spout and the second spout, both the first spout and the second spout spray the cleaner onto the solar cell, which forms a scouring force on the mask on the surface of the solar cell and speeds up peeling off of the mask on the surface of the solar cell. Moreover, the first spout and the second spout arranged symmetrically enable the solar cell to be evenly stressed up and down, thereby preventing fragmentation caused by the stress only on an upper surface or a lower surface of the solar cell.

Optionally, the first spout is located below a top end of the upper conveying roller (the region E in FIG. 4a), and the second spout is located above a bottom end of the lower conveying roller 2220 (the region F in FIG. 4a), so that the cleaner sprayed by the first spout and the second spout has a strong impact force on the solar cell.

Optionally, the first spout is arranged below an upper surface of the cleaner accommodated in the soaking tank 2100, so that both the first spout and the second spout are located below the cleaner, preventing reduction of the cleaning efficiency caused by generation of bubbles due to bringing of outside air into the cleaner. The spout is immersed in the cleaner and sprays the cleaner onto the solar cell. Due to the obstruction of the liquid, the impact force on the solar cell may be reduced, which can reduce a fragmentation rate of the solar cell.

It is to be noted that the above are merely optional examples, and the cleaning device may alternatively include only the upper cleaning nozzle or the lower cleaning nozzle to clean the solar cell, all of which should be understood to be within the scope of the present disclosure.

Optionally, a liquid feeding mechanism (a mechanism that provides the cleaner) is connected to the cleaning nozzle through a pipeline, so as to supply the cleaner to the cleaning nozzle.

Further, the cleaning device 2000 further includes a cleaner tank, the cleaner tank accommodates the cleaner, and the cleaner tank is communicated with the cleaning nozzle to supply the cleaner to the nozzle.

As shown in FIG. 1, the cleaner tank accommodates the cleaner, one pipeline is connected to a first end of a liquid pump, and the other pipe is connected to the cleaning nozzle, so that the cleaning nozzle can be supplied with the cleaner smoothly.

Further, the cleaner tank includes a first cleaner tank 2510 and a second cleaner tank 2520, and the cleaning nozzle is supplied with the cleaner through the first cleaner tank 2510 or the second cleaner tank 2520.

As shown in FIG. 1, a first valve 2511 and a second valve 2521 may be arranged, a first end of the first valve 2511 is communicated with the first cleaner tank 2510, and a second end of the second valve 2521 is communicated with the second cleaner tank 2520. If the first valve 2511 is opened and the second valve 2521 is closed, the cleaning nozzle can be supplied with the cleaner through the first cleaner tank 2510. If the second valve 2521 is opened and the first valve 2511 is closed, the cleaning nozzle can be supplied with the cleaner through the second cleaner tank 2520. Therefore, during maintenance of one cleaner tank, the cleaning nozzle can be supplied with the cleaner through the other cleaner tank, thereby improving efficiency.

In some embodiments of the present disclosure, the bottom of the soaking tank 2100 is formed as a funnel shape, and the soaking tank 2100 is provided with a liquid outlet at a bottom end.

The funnel shape has a configuration having a low center and higher surroundings. Due to gravity, mask residue may gather towards a lower port of the funnel-shaped soaking tank 2100, a bottom end of the soaking tank 2100 corresponds to the lower port, and the liquid outlet is arranged at the bottom end, thereby facilitating timely discharge of the mask residue.

A cleaning system according to an embodiment of the present disclosure is described below.

Figure 10:
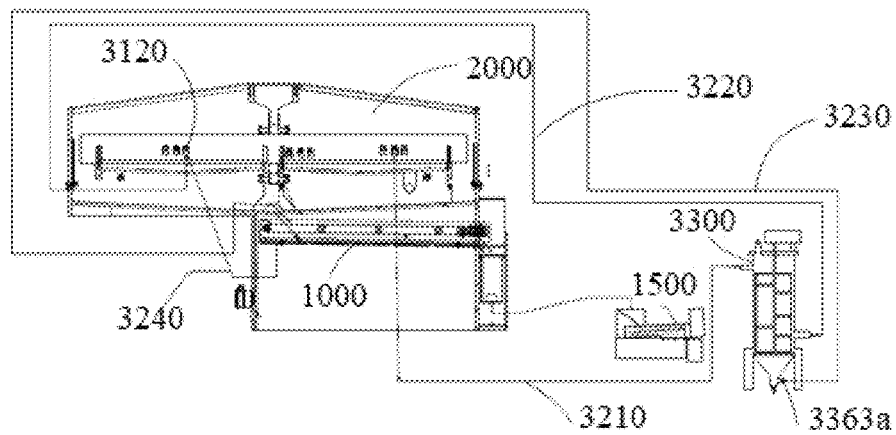
FIG. 10 is a structural diagram of a second embodiment of the cleaning system according to the present disclosure.

The cleaning system includes a cleaning device 2000 and a filtering device 3000 (as shown in FIG. 1 and FIG. 5), or includes a cleaning device 2000 and a mask residue separation device 1000, or includes a cleaning device 2000, a filtering device 3000, and a mask residue separation device 1000 (as shown in FIG. 10). The cleaning device 2000 is any one of the above cleaning devices. Optionally, a liquid outlet is arranged at the bottom of the soaking tank 2100.

The filtering device 3000 is configured to filter a first substance, which can realize reuse of the cleaner. The mask residue separation device 1000 is configured to separate the first substance, which can separate the cleaner from mask residue. The cleaner can be reused and the mask residue can be treated separately, thereby reducing costs.

The first substance, a second substance, a third substance, a fourth substance, a fifth substance, a sixth substance, a seventh substance, and an eighth substance hereinafter are all mixtures of the mask residue and the cleaner, and are different in proportions of the mask residue and the cleaner.

The first substance is a substance flowing out of the soaking tank 2100 (which may be directly discharged from the liquid outlet at the bottom of the soaking tank 2100 or sucked out through a sucking port of a sucking apparatus). The second substance is a substance (main component is the cleaner) after the first substance is filtered by a cleaner filter. The third substance is a substance (main component is the mask residue) remaining after the first substance is blocked by a filter element of the cleaner filter. The fourth substance is a substance (main component is the cleaner) after the third substance is filtered by the mask residue separation device. The fifth fourth substance is a substance (main component is the mask residue) remaining on a conveyor belt 1110 after the first substance or the third substance is filtered by the conveyor belt 1110. The sixth substance is a substance (main component is the cleaner) penetrating the conveyor belt 1110 after the first substance is filtered by the conveyor belt 1110. The seventh substance is a substance (main component is the mask residue) remaining after the fifth substance is extruded by an extruder or centrifugally rotated by a centrifuge. The eighth substance is a substance (main component is the cleaner) discharged when the fifth substance is extruded by the extruder or centrifugally rotated by the centrifuge.

A filtering device according to an embodiment of the present disclosure is described below.

As shown in FIG. 5, a cleaning system according to an embodiment of the present disclosure includes a cleaning device 2000 and a filtering device 3000. The filtering device 3000 includes a sucking apparatus and a spraying apparatus.

Firstly, the sucking apparatus will be described. The sucking apparatus includes a sucking port 3110, and the first substance is sucked through the sucking port 3110. The first substance is a mixture of the cleaner and the mask residue. If one sucking port 3110 is provided, the sucking port 3110 is arranged above the bottom of the soaking tank 2100 and oriented the bottom of the soaking tank 2100, or is connected to the bottom of the soaking tank 2100. If a plurality of sucking ports 3110 are provided, several of the sucking ports 3110 are arranged above the bottom of the soaking tank 2100 and oriented the bottom of the soaking tank 2100, and the other of the sucking ports 3110 are connected to the bottom of the soaking tank 2100, or all the sucking ports are arranged above the bottom of the soaking tank 2100, or all the sucking ports are connected to the bottom of the soaking tank 2100.

In addition to the sucking port, the sucking apparatus further includes an sucking pump and an sucking pipeline. The sucking pipeline has one end connected to the sucking pump and the other end connected to the sucking port. Operation of the sucking pump creates a sucking force, thereby sucking the first substance.

The soaking tank 2100 accommodates the cleaner, and the solar cell (the solar cell with a mask attached) is cleaned in the cleaner. During the cleaning, the mask on the surface of the solar cell may peel off, which forms mask residue and falls to the bottom of the soaking tank 2100.

The first substance at the bottom of the soaking tank 2100 can be sucked out in time through the sucking port 3110, thereby preventing impossible cleaning up of the mask on the surface of the solar cell due to a decrease in the cleaning effect of the cleaner caused by excessive accumulation of the mask residue in the soaking tank 2100.

Figure 6A:
FIG. 6a is a distribution diagram of an embodiment of a sucking port and a spraying port according to the present disclosure.
Figure 6A:
Figure 6B:
FIG. 6b is a distribution diagram of an another embodiment of a sucking port and a spraying port according to the present disclosure.
Figure 6B:
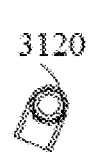

As shown in FIG. 6a, the sucking port 3110 may be arranged above the bottom of the soaking tank 2100 and adjacent to the bottom of the soaking tank 2100, to suck the first substance accommodated in a bottom layer of the soaking tank 2100 out of the soaking tank 2100. Therefore, an upward suction force may be formed on the first substance located at the bottom of the soaking tank 2100, so as to facilitate sucking of the mask residue in the first substance and prevent excessive adhesion of the mask residue caused by accumulation at the bottom of the soaking tank 2100 only due to its own gravity. As shown in FIG. 6b, the sucking port 3110 may alternatively be connected to the bottom of the soaking tank 2100, to suck the first substance accommodated at the bottom of the soaking tank 2100 out of the soaking tank 2100, from the bottom of the soaking tank 2100. Therefore, the mask residue deposited at the bottom of the soaking tank 2100 gathers in a direction of the sucking port due to the sucking force, and the mask residue deposited at the bottom of the soaking tank 2100 can be sucked. When the sucking port 3110 is connected to the bottom of the soaking tank 2100, a funnel shape may be formed at the bottom of the soaking tank 2100 at a junction with the sucking port 3110, and a funnel-shaped region at the bottom of the soaking tank 2100 can accommodate more mask residue. Due to gravity and the sucking force, the mask residue is more likely to accumulate in the center of the sucking port and are easier to be sucked, which increases sucking efficiency of the mask residue. The sucking port 3110 may alternatively be arranged above the bottom of the soaking tank 2100 and connected to the bottom of the soaking tank 2100 at the same time. That is, when a plurality of sucking ports 3110 are provided, a part of the sucking ports are arranged above the bottom of the soaking tank 2100 and the others sucking ports are connected to the bottom of the soaking tank 2100. The sucking port is different from the liquid outlet.

Next, the spraying apparatus will be described. The spraying apparatus includes a spraying port 3120. The spraying port 3120 is arranged above the bottom of the soaking tank 2100 and adjacent to the bottom of the soaking tank 2100.

The spraying port 3120 is located on a side of the sucking port 3110 and at a predetermined distance from the sucking port 3110. The spraying port 3120 is oriented a region in the bottom of the soaking tank 2100 that the sucking port 3110 is capable of sucking. Liquid or gas is sprayed through the spraying port 3120 to flush the bottom of the soaking tank 2100. The predetermined distance is a distance at which the liquid or gas sprayed from the spraying port 3120 can reach the vicinity of the sucking port 3110.

The region that the sucking port 3110 is capable of sucking refers to a region on the bottom of the soaking tank 2100 covered by an sucking stroke range of a single sucking port 3110, or a plurality of regions on the bottom of the soaking tank 2100 covered by sucking stroke ranges of a plurality of sucking ports 3110 and a total region encircled by the plurality of regions.

Figure 9:
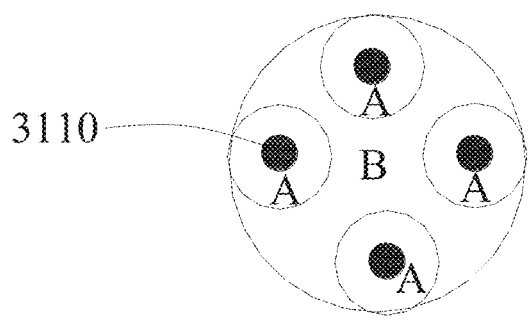
FIG. 9 is a schematic diagram of an embodiment of a region sucked by the sucking port according to the present disclosure.

For example, as shown in FIG. 9, four sucking ports 3110 are included. A sucking stroke range of a single sucking port 3110 is A, a region encircled by a plurality of regions A is B, and then the spraying port 3120 may be oriented the region B at the bottom of the soaking tank 2100.

In addition to the spraying port 3120, the spraying apparatus further includes a spraying power member and a spraying pipeline. Liquid or gas is pumped from the outside through the spraying power member to the spraying pipeline, and then sprayed from the spraying port. The power member for pumping the liquid from the outside may be a jet pump, and the power member for pumping the gas from the outside may be a fan.

The sucking port 3110 has a limited diameter and a limited sucking range, and not all the mask residue at the bottom of the soaking tank 2100 can be sucked in the wide range. Moreover, the mask residue is attached to the bottom of the soaking tank 2100 and has adhesion to the bottom of the soaking tank 2100, making the sucking more difficult.

In order to suck the mask residue falling onto the bottom of the soaking tank 2100 more comprehensively, the liquid or gas is sprayed towards the bottom of the soaking tank 2100 and towards the sucking port 3110 through the spraying port 3120 of the spraying apparatus (the spraying port 3120 is diagonally opposite to the sucking port 3110) to form a flushing force on the mask residue to peel off the mask residue from the bottom of the soaking tank 2100 and move the mask residue towards the sucking port 3110, thereby widen the mask residue sucking range of the sucking port 3110 and improving an sucking capability of the mask residue.

Finally, the filtering apparatus will be described. The filtering apparatus is connected to the sucking apparatus to receive and filter the first substance sucked by the sucking port.

Therefore, the first substance can be filtered, the filtered first substance can be reused, reducing a waste of the cleaner, and the mask residue after the filtering can be treated in a centralized manner, which prevents the problem of high treatment costs for the discarded first substance including excessive cleaner, thereby saving costs.

In the above filtering device, the mask residue is deposited at the bottom of the soaking tank 2100, the sucking port 3110 of the sucking apparatus sucks the first substance including a large amount of mask residue at the bottom of the soaking tank 2100 out of the soaking tank 2100, the spraying port 3120 of the spraying apparatus sprays liquid or gas towards the bottom of the soaking tank 2100 and towards the sucking port 3110 to form a flushing force on the mask residue to peel off the mask residue from the bottom of the soaking tank 2100 and move the mask residue towards the sucking port 3110, thereby widen the mask residue sucking range of the sucking port 3110 and improving an sucking capability of the mask residue. Therefore, content of the mask residue in the soaking tank 2100 can be reduced, pollution of the cleaner by the mask residue can be reduced, and the costs can be saved.

In some embodiments of the present disclosure, the sucking apparatus includes a plurality of sucking port groups spaced apart, the spraying apparatus includes a plurality of spraying port groups in one-to-one correspondence to the plurality of sucking port groups each of the sucking port groups includes at least one sucking port 3110, and each of the spraying port groups includes at least one spraying port 3120.

The sucking ports 3110 and the spraying ports 3120 can better cover the bottom of the soaking tank 2100, which increases a cleaning area of the mask residue in the soaking tank 2100 and improves a cleaning capability of the cleaner in the soaking tank 2100 to continuously clean the solar cell (the solar cell and the like).

Further, each of the sucking port groups includes one sucking port 3110, each of the spraying port groups includes two spraying ports 3120, and the two spraying ports 3120 in each group are arranged on two sides of the sucking ports 3110 respectively. Alternatively, each of the sucking port groups 3110 includes one sucking port 3110, each of the spraying port groups 3120 includes three or four spraying ports 3120, and the three or four spraying ports 3120 are arranged around the one sucking port 3110.

Figure 7:
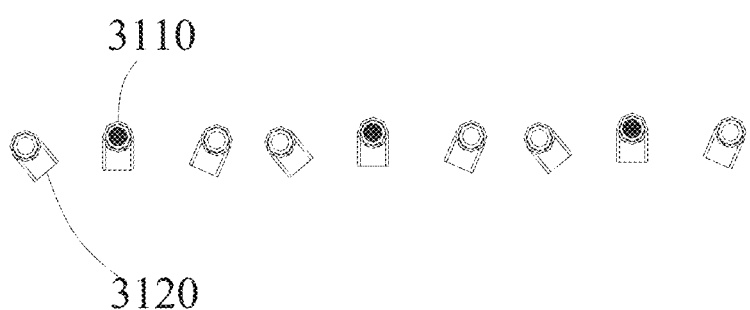
FIG. 7 is a structural diagram of a first embodiment of a sucking apparatus and a spraying apparatus according to the present disclosure.

As shown in FIG. 7, each of the sucking port groups includes one sucking port 3110, and each of the spraying port groups 3120 includes two spraying ports 3120 arranged on two sides of the sucking port 3110.

Figure 8A:
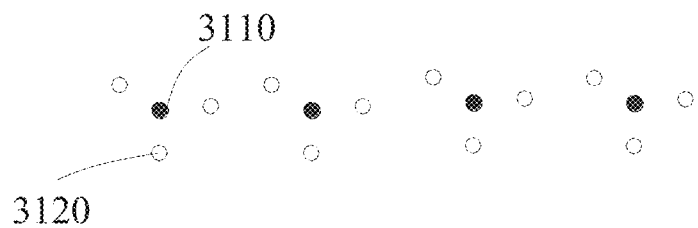
FIG. 8a is a structural diagram of a second embodiment of the sucking apparatus and the spraying apparatus according to the present disclosure.

As shown in FIG. 8a, each of the sucking port groups includes one sucking port 3110, and each of the spraying port groups includes three spraying ports 3120 arranged around the sucking port 3110.

Figure 8B:
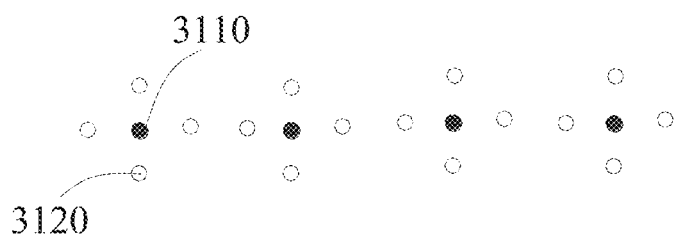
FIG. 8b is a structural diagram of a third embodiment of the sucking apparatus and the spraying apparatus according to the present disclosure.

As shown in FIG. 8b, each of the sucking port groups includes one sucking port 3110, and each of the spraying port groups includes four spraying ports 3120 arranged around the sucking port 3110.

Therefore, the mask residue sucking range and capability of the sucking port 3110 can be further widened.

In some embodiments of the present disclosure, the filtering apparatus includes a first pipeline 3210 and a cleaner filter 3300. The cleaner filter 3300 is connected to the first pipeline 3210 to filter the first substance from the first pipeline 3210.

Figure 11:
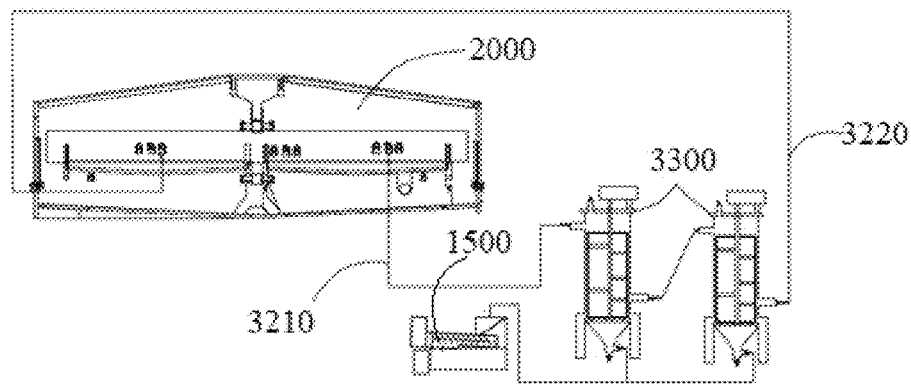
FIG. 11 is a structural diagram of a third embodiment of the cleaning system according to the present disclosure.
Figure 12:
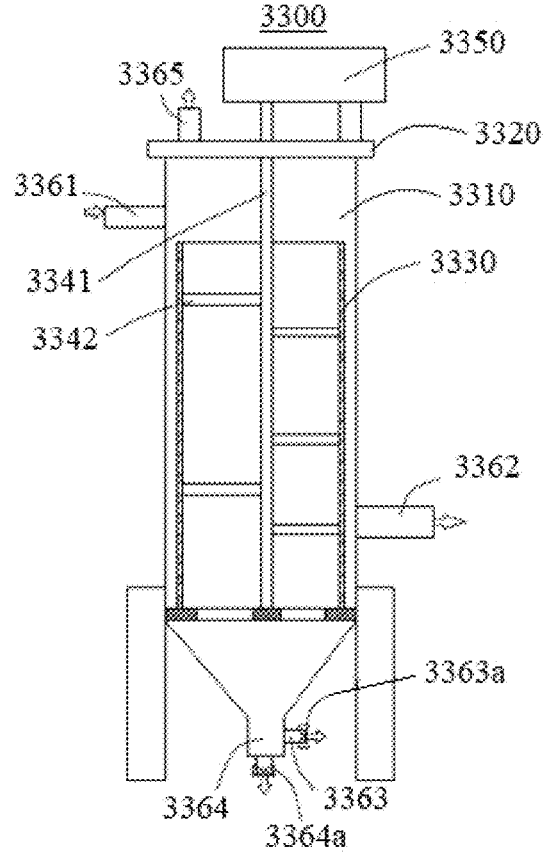
FIG. 12 is a structural diagram of an embodiment of a cleaner filter according to the present disclosure.

As shown in FIG. 10 to FIG. 12, the cleaner filter 3300 receives the first substance from the first pipeline 3210, and the cleaner filter 3300 separates the mask residue and the cleaner in the first substance. The first substance is filtered by the cleaner filter 3300, and the second substance with a lower proportion of the mask residue and other substances with a higher proportion of the mask residue remaining in the cleaner filter 3300 flow out. Therefore, the first substance can be filtered, centralized treatment of the mask residue is facilitated, and the use of the cleaner is realized.

Further, the filtering device further includes a second pipeline 3220. A first end of the second pipeline 3220 is communicated with the cleaner filter 3300 to output the second substance passing through the cleaner filter 3300, the second substance is a substance after the first substance is filtered by the cleaner filter 3300, and a second end of the second pipeline 3220 is communicated with the spraying apparatus.

The second substance with a lower proportion of the mask residue is separated from the first substance by the filtering apparatus, the second substance is fed into the spraying apparatus, and the second substance is sprayed into the soaking tank 2100 through the spraying port 3120, which maintains a liquid level of the cleaner in the soaking tank 2100 and can continuously reduce the content of the mask residue accommodated in the soaking tank 2100.

In some embodiments of the present disclosure, a plurality of cleaner filters 3300 are provided, the plurality of cleaner filters 3300 are sequentially connected to sequentially filter the first substance from the first pipeline 3210, and a filter pore size of the cleaner filter 3300 downstream is smaller than a filter pore size of the cleaner filter 3300 upstream.

As shown in FIG. 11, two cleaner filters 3300 are provided, and the two cleaner filters 3300 sequentially filter the first substance. A pore size of a filtering hole of the cleaner filter 3300 located at the rear is smaller than a pore size of the filtering hole of the cleaner filter 3300 located in the front. The cleaner filter 3300 in the front realizes coarse filtration of the first substance, and the cleaner filter 3300 at the rear realizes fine filtration of the first substance, so that the proportion of the mask residue of the second substance outputted by the cleaner filter 3300 is lower, thereby further reducing the content of the mask residue in the soaking tank 2100.

It is to be noted that the above are merely optional examples, and three, four, or five cleaner filters 3300 may alternatively be provided, all of which should be understood to be within the scope of the present disclosure.

In some embodiments of the present disclosure, the cleaner filter 3300 includes a barrel body 3310 and a filter element 3330. The barrel body 3310 is configured to accommodate the first substance. A feed port 3361 is formed on an upper portion of the barrel body 3310 and a discharge port 3362 is formed on a lower portion of the barrel body 3310, the first substance from the first pipeline 3210 is received through the feed port 3361, and the second pipeline 3220 is supplied with the second substance through the discharge port 3362. The filter element 3330 is arranged in the barrel body 3310, the filter element 3330 is formed as a hollow cylinder shape, and the first substance flows from the feed port 3361 into a hollow region of the filter element 3330 and flows out to the discharge port 3362 through the filter element 3330.

As shown in FIG. 12, the filter element 3330 is formed as a hollow cylinder. That is, an axial middle portion is formed as the hollow region. The barrel body 3310 accommodates the filter element 3330. The first substance flows into the hollow region through the feed port 3361 of the barrel body 3310, and the first substance flows out of the filter element 3330 along a side wall of the filter element 3330, thereby reaching the discharge port 3362 of the barrel body 3310 and then flowing out through the second pipeline 3220.

A space inside the barrel body 3310 may be formed as a middle chamber (corresponding to the hollow region), a filtering region (corresponding to the filter element 3330), and an outer water outlet chamber (a spacing region between the filter element 3330 and an inner wall of the barrel body 3310).

The filter element 3330 may filter the first substance and block the mask residue that exceed a pore size of a filtering hole of the filter element 3330 from flowing to the discharge port 3362.

The filter element 3330 and the barrel body 3310 may have detachable configuration to facilitate replacement of the filter element 3330.

Further, the cleaner filter 3300 further includes a barrel cover 3320, a cleaning paddle, a driving mechanism 3350, and a controller. The barrel cover 3320 covers the top of the barrel body 3310, and an exhaust port 3365 is formed on the top of the barrel cover 3320. The cleaning paddle passes through the middle of the barrel cover 3320 and is accommodated in the hollow region, and the cleaning paddle is in contact with an inner wall of the filter element 3330 to clean the filter element 3330. The driving mechanism 3350 is arranged on the barrel cover 3320 and connected to the cleaning paddle to drive the cleaning paddle to rotate. The controller is connected to the driving mechanism 3350 to control the driving mechanism 3350 to rotate the cleaning paddle. The driving mechanism 3350 may be a motor, a rotating cylinder, or a hydraulic rotating mechanism.

The barrel cover 3320 covers the top of the barrel cover 3320 to prevent pollution of the cleaner in the barrel body 3310 by external pollutants. The exhaust port 3365 is arranged on the barrel cover 3320 to discharge the gas in the barrel body 3310. The first pipeline may carry part of the gas into the barrel body 3310. When the barrel body 3310 and the barrel cover are completely sealed, the gas may occupy the space in the barrel body 3310, which reduces a capacity of the barrel body 3310 to accommodate the first substance. In order to solve the problem, the exhaust port 3365 is formed on the barrel cover 3320 to discharge the gas in the barrel body 3310 in a timely manner and improve filtering efficiency of the cleaner filter 3300.

An exhaust valve may be arranged on the exhaust port 3365. When the first substance is conveyed to the barrel body 3310 according to the first pipeline 3210, the exhaust valve is opened, and is closed at other times. A check valve may alternatively be arranged on the exhaust port 3365. The check valve may allow the gas in the barrel body 3310 to be discharged from the barrel, and external gas cannot enter the barrel. Therefore, while the gas in the barrel body 3310 is discharged in a timely manner, the pollution of the cleaner in the barrel body 3310 by the external pollutants can be reduced.

During the filtering of the first substance through the filter element 3330, the mask residue in the first substance may be adsorbed on the inner wall of the filter element 3330, the controller controls the driving mechanism 3350 to rotate the cleaning paddle, and the cleaning paddle contacts the inner wall of the filter element 3330 to clean and adsorb the mask residue on the inner wall of the filter element 3330. In addition, the rotation of the cleaning paddle can form a downward flow force on the first substance (similar to blades of a water pump, which pumps upstream liquid to downstream), and the mask residue may accelerate downward accumulation, which reduces clogging during the use of the filter element 3330 and increases filtering efficiency.

Further, the cleaning paddle includes a rotating shaft 3341 and blades 3342. The rotating shaft 3341 is arranged vertically and has a top end connected to the driving mechanism 3350. The blades 3342 are arranged around the rotating shaft 3341, and the blades 3342 include scrapers or brushes.

The driving mechanism 3350 drives the rotating shaft 3341 to rotate, the rotating shaft 3341 drives the blades 3342 connected thereto to rotate, and the blades 3342 contact the inner wall of the filter element 3330, so as to clean the inner wall of the filter element 3330. Therefore, the cleaning paddle that cleans the filter element 3330 can be easily realized.

In some embodiments of the present disclosure, a first drain outlet 3363 is formed at the bottom of the barrel body 3310. The filtering device further includes a first drain valve 3363a connected to the first drain outlet 3363, a third substance can be discharged when the first drain valve 3363a is opened, and the third substance is a substance remaining after the first substance is blocked by the filter element of the cleaner filter 3300.

The first drain valve 3363a is opened, and the third substance deposited at the bottom of the barrel body 3310 can be discharged, which reduces an amount of the mask residue in the barrel body 3310 and realizes self-cleaning.

Further, the cleaner filter has operating modes including a first mode and a second mode, and the controller is further connected to the first drain valve 3363a and switches the first mode and the second mode based on a predetermined condition. In the first mode, the controller controls the driving mechanism 3350 to drive the cleaning paddle to rotate and closes the first drain valve 3363a, and in the second mode, the controller controls the driving mechanism 3350 to drive the cleaning paddle to rotate and opens the first drain valve 3363a. The predetermined condition may be a predetermined self-cleaning interval time, or the first pipeline 3210 stopping feeding liquid, or, the cleaner filter 3300 further includes a pressure difference gauge, a pressure difference between inflow pressure of the first substance and outflow pressure of the second substance is tested through the pressure difference gauge, and the predetermined condition may be the pressure difference reaching a predetermined difference.

The first mode may be a normal operating mode, wherein the controller controls the driving mechanism 3350 to drive the cleaning paddle to rotate and closes the first drain valve 3363a, and the mask residue gradually accumulates at the bottom of the barrel body 3310. The second mode may be a self-cleaning mode, wherein the controller controls the driving mechanism 3350 to drive the cleaning paddle to rotate and opens the first drain valve 3363a, and the mask residue accumulated at the bottom of the barrel body 3310 is discharged to reduce the amount of the mask residue in the barrel body 3310.

The controller switches the first mode and the second mode based on the predetermined condition. The predetermined condition may be the following three conditions.

1) The controller automatically switches to the second mode according to a time period during which the filtering apparatus operates in the first mode reaching the self-cleaning interval time period.
2) The controller automatically switches to the second mode according to the first pipeline 3210 stopping feeding liquid to the barrel body 3310.
3) The cleaner filter 3300 further includes a pressure difference gauge, a pressure difference between inflow pressure of the first substance and outflow pressure of the second substance is tested through the pressure difference gauge, and the pressure difference reaches a predetermined difference. The controller automatically switches to the second mode when the filtering apparatus tests, during operation in the first mode, that the pressure difference reaches the predetermined difference.

Therefore, mode switching can be performed, which prevents excessive accumulation of the mask residue in the barrel body 3310 and reduces the amount of the mask residue in the barrel body 3310.

Further, a second drain outlet 3364 spaced apart from the first drain outlet 3363 is further formed at the bottom of the barrel body 3310, and the filtering device further includes a second drain valve 3364a connected to the second drain outlet 3364.

During maintenance, the second drain valve 3364a can be opened, and the substance in the barrel body 3310 is emptied (discharged to the outside) through the second drain outlet 3364 and the second drain valve 3364a for thorough cleaning, to facilitate the maintenance.

In some embodiments of the present disclosure, the cleaning device further includes a third pipeline 3230, a mask residue separation device 1000, and a fourth pipeline 3240. The third pipeline 3230 is connected to the first drain valve 3363a. The mask residue separation device 1000 buts the third pipeline 3230 to filter the third substance. The fourth pipeline 3240 has a first end communicated with the mask residue separation device 1000 and a second end connected to the spraying port 3120 to transfer the fourth substance into the spraying port 3120. The fourth substance is a substance after the third substance is filtered by the mask residue separation device 1000.

The mask residue separation device 1000 filters the third substance, separates the mask residue in the third substance, transfers the fourth substance including a smaller amount of mask residue into the fourth pipeline 3240 and the spraying port 3120, and finally injects the fourth substance into the soaking tank 2100, which increases a liquid level of the soaking tank 2100 and reduces a waste of the cleaner.

The mask residue separation device 1000 according to an embodiment of the present disclosure is described below.

As shown in FIG. 13 to FIG. 23, the mask residue separation device 1000 according to this embodiment of the present disclosure includes a conveyor belt 1110, a first transmission shaft 1120, a second transmission shaft 1130, and a mask residue collector 1400.

Firstly, the first transmission shaft 1120, the second transmission shaft 1130, and the conveyor belt 1110 will be described. The first transmission shaft 1120 and the second transmission shaft 1130 are transversely spaced apart. The conveyor belt 1110 encircles the first transmission shaft 1120 and the second transmission shaft 1130, the conveyor belt 1110 is capable of reciprocating around the first transmission shaft 1120 and the second transmission shaft 1130, the conveyor belt is formed as a first filter screen, and the conveyor belt receives the first substance and/or the third substance flowing in from thereabove. The reciprocating may be motion shown by an arrow in FIG. 14a. The conveyor belt 1110 may directly receive the first substance through the liquid outlet at the bottom of the soaking tank 2100, or receive the third substance through the third pipeline, or synchronously receive the first substance through the liquid outlet at the bottom of the soaking tank 2100 and receive the third substance through the third pipeline.

The conveyor belt 1110 is provided with first filtering holes, and the conveyor belt 1110 is formed as the first filter screen. In an operating state, the conveyor belt 1110 receives the first substance flowing in from thereabove, and filters the first substance. The mask residue filtered out is transferred to a preset mask residue unloading position through the conveyor belt 1110, and the cleaner filtered out flows into a preset cleaner collection point. The first substance mainly includes mask residue and cleaner, and may further include debris of the solar cell and other impurities. The mask residue is the mask peeled off from the surface of the solar cell.

Definitions are as follows. As shown in FIG. 15, the conveyor belt 1110 above the first transmission shaft 1120 and the second transmission shaft 1130 is an upper conveyor belt 1112, the conveyor belt 1110 below the first transmission shaft 1120 and the second transmission shaft 1130 is a lower conveyor belt 1113, an inner surface of the annular conveyor belt 1110 is a lower surface of the conveyor belt 1110, and an outer surface of the annular conveyor belt 1110 is an upper surface of the conveyor belt 1110.

Specifically, the conveyor belt 1110 includes the upper conveyor belt 1112, a corner belt 1114, and a conveyor belt. The upper conveyor belt 1112 and the lower conveyor belt 1113 are spaced up and down and arranged parallel to each other. Two ends of the upper conveyor belt 1112 and the lower conveyor belt 1113 are connected respectively through two corner belts 1114, and the two corner belts 1114 are wound around the first transmission shaft 1120 and the second transmission shaft 1130 respectively.

The upper conveyor belt 1112 receives and filters the first substance flowing in from thereabove. The upper conveyor belt 1112 transfers the fifth substance filtered out to the preset mask residue unloading position along a preset direction, and causes the cleaner filtered out to flow into the preset cleaner collection point. A preset direction in which the mask residue is conveyed is a horizontal direction or an inclined direction at an angle to the horizontal direction. Preferably, the angle between the inclined direction and the horizontal direction is less than 60 degrees. More specifically, the preset direction is a transverse direction in FIG. 13. The mask residue collector 1400 may be arranged at the preset mask residue unloading position, and the cleaner collection point may be a liquid collection tank below the upper conveyor belt 1112.

The first substance is a mixture of the mask residue and the cleaner after the cleaner in the cleaning device 2000 peels off the mask from the solar cell. The first substance flows in from above the conveyor belt 1110, and the first substance flows into the conveyor belt 1110 and is filtered by the conveyor belt 1110 to separate the mask residue from the cleaner in time, which prevents continuous reduction of active components in the cleaner caused by continued reaction between the mask residue and the cleaner. The cleaner obtained by filtering by the conveyor belt 1110 can be supplied to the cleaning device 2000 again, thereby reducing the waste of the cleaner.

Optionally, the conveyor belt 1110 is formed to have an annular configuration, and the preset direction in which the mask residue is conveyed is a transverse rightward direction in FIG. 13. The upper conveyor belt 1112 performs primary filtering on the first substance, and the lower conveyor belt 1113 performs secondary filtering on the first substance. The filtering effect can be improved through the two filtering.

The conveyor belt 1110 is formed to have an annular configuration, the first transmission shaft 1120 penetrates a transverse first end of the conveyor belt 1110, the second transmission shaft 1130 penetrates a transverse second end of the conveyor belt 1110, and the first transmission shaft 1120 and the second transmission shaft 1130 provide the conveyor belt 1110 with predetermined tension and drive the conveyor belt 1110 to rotate circularly. A partial region of the conveyor belt 1110 moves transversely, which can drive the fifth substance located on the upper surface thereof to move transversely, thereby transferring the fifth substance. The partial region of the conveyor belt 1110 may be the upper conveyor belt 1112 above. The transverse first end of the conveyor belt 1110 or the middle of the conveyor belt 1110 receives the first substance, and therefore, the transverse first end of the conveyor belt 1110 or the middle of the conveyor belt 1110 is regarded as a feed end of the conveyor belt 1110. The first substance is filtered by the conveyor belt 1110 to form the fifth substance, and the fifth substance is discharged from the transverse second end of the conveyor belt 1110. Therefore, the transverse second end of the conveyor belt 1110 is regarded as a discharge end of the conveyor belt 1110.

It is to be noted that the above are merely optional examples. As shown in FIGS. 14a, 14b and 14c, in addition to the first transmission shaft 1120 and the second transmission shaft 1130, the mask residue separation device may further include other transmission shafts (as shown in FIGS. 14a, 14b and 14c). In the transmission shafts, the second transmission shaft is a transmission shaft at a transverse end. A transmission shaft that provides power is not limited herein, which may be the first transmission shaft, the second transmission shaft or other transmission shafts, as long as the transmission shaft can drive the conveyor belt to reciprocate.

Next, the mask residue collector will be described. The mask residue collector 1400 is arranged corresponding to the discharge end of the conveyor belt 1110 to receive the fifth substance transferred by the discharge end of the conveyor belt 1110. The fifth substance is a substance remaining on the conveyor belt after the first substance is filtered by the conveyor belt 1110. The fifth substance mainly includes the mask residue, and may further include debris of the solar cell and other impurities.

That is, the mask residue collector 1400 is below the discharge end of the conveyor belt 1110 for transverse conveying. Due to gravity, the fifth substance conveyed to the discharge end of the conveyor belt 1110 may fall to the mask residue collector 1400. The mask residue is collected by the mask residue collector 1400, so that the mask residue can be treated in a centralized manner to prevent pollution caused by scattering of the mask residue.

In the mask residue separation device 1000 in the above embodiment, the first transmission shaft 1120 and the second transmission shaft 1130 drive the annular conveyor belt 1110 to rotate cyclically, the conveyor belt 1110 receives the first substance flowing in from thereabove, the first substance is filtered by the upper conveyor belt 1112 and the lower conveyor belt 1113, and the cleaner obtained by filtering can be supplied again to the cleaning device 2000, thereby reducing the waste of the cleaner. The fifth substance remaining on the conveyor belt 1110 is filtered, is conveyed transversely by the conveyor belt 1110, and falls to the mask residue collector 1400, which facilitates subsequent centralized treatment of the mask residue. Therefore, the mask residue separation device 1000 can filter the first substance easily and efficiently to realize the separation of the mask residue. The cleaner after the filtering is collected and can be reused, which can realize recycling of the cleaner, thereby reducing the waste of the cleaner and reducing the costs.

Figure 23:
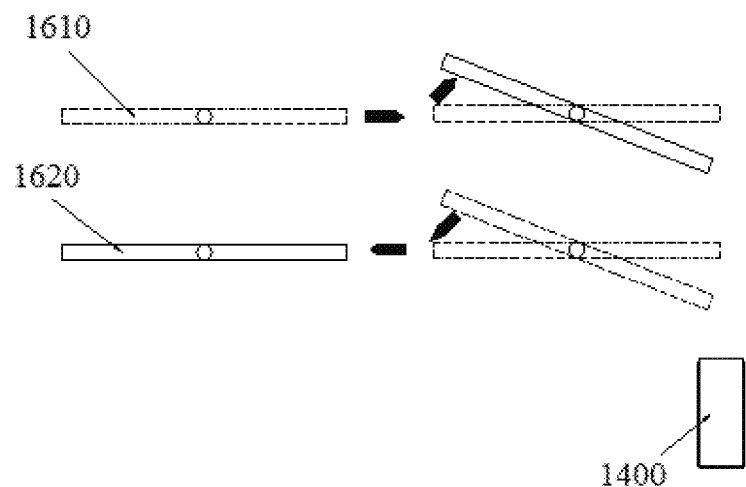
FIG. 23 is a structural diagram of a third embodiment of the mask residue separation device according to the present disclosure.

It is to be noted that the above are merely optional examples. As shown in FIG. 23, the first transmission shaft, the second transmission shaft, and the conveyor belt may be replaced by a first conveying screen 1610 and a second conveying screen 1620.

The first conveying screen 1610 and the second conveying screen 1620 are spaced up and down, and both can realize switching between a horizontal state and a dumping state. The dumping state may be a downward inclining state or a flipping state.

A first moving mechanism is connected to the first conveying screen 1610 to drive the first conveying screen 1610 to move transversely to reciprocate between a first receiving position and a first discharging position. A second moving mechanism is connected to the second conveying screen 1620 to drive the second conveying screen 1620 to move transversely to reciprocate between a second receiving position and a second discharging position. The first moving mechanism and the second moving mechanism may include a linear module (motor driven) or an electric cylinder module (electric cylinder driven).

The first receiving position and the second receiving position correspond to stations for receiving the first substance, and the first discharging position and the second discharging position correspond to stations for dumping the fifth substance. The first conveying screen 1610 at the first receiving position and the second conveying screen 1620 at the second receiving position are both in the horizontal state to receive the first substance and transversely convey the first substance. The first conveying screen 1610 at the first discharging position and the second conveying screen 1620 at the second discharging position switch from the horizontal state to the downward dumping state to dump the fifth substance, and return to the horizontal state from the dumping state after the dumping of the fifth substance.

When the first conveying screen 1610 is at the first receiving position, the second conveying screen 1620 is at the discharging position. When the first conveying screen 1610 is at the first discharging position, the second conveying screen 1620 is at the receiving position.

The first substance is filtered through the first conveying screen 1610 and the second conveying screen 1620.

The mask residue collector 1400 correspond to the first discharging position and the second discharging position to receive the fifth substance dumped from the first conveying screen 1610 and the second conveying screen 1620.

After the fifth substance falls from the discharge end of the conveyor belt 1110 into the mask residue collector 1400, a small amount of the fifth substance still remains on the conveyor belt 1110. The fifth substance mainly includes the mask residue, and the mask residue filtered and separated by the conveyor belt 1110 is also easily adhered to the conveyor belt 1110. The fifth substance remaining on the conveyor belt 1110 may cause the filtering hole on the conveyor belt 1110 to be clogged, affecting a filtering effect of the conveyor belt 1110.

Based on this, in some embodiments of the present disclosure, the mask residue separation device 1000 further includes a cleaning apparatus. The cleaning apparatus is adjacent to the discharge end of the conveyor belt 1110. The cleaning apparatus can remove the fifth substance remaining on the conveyor belt 1110, thereby preventing clogging of the filtering hole on the conveyor belt 1110.

Specifically, the cleaning apparatus is adjacent to the second transmission shaft 1130 (the second transmission shaft 1130 is adjacent to the discharge end of the conveyor belt 1110), to clean the conveyor belt 1110 located at an end or below the second transmission shaft 1130 and sweep the fifth substance on the conveyor belt 1110 to the mask residue collector 1400.

Figure 19:
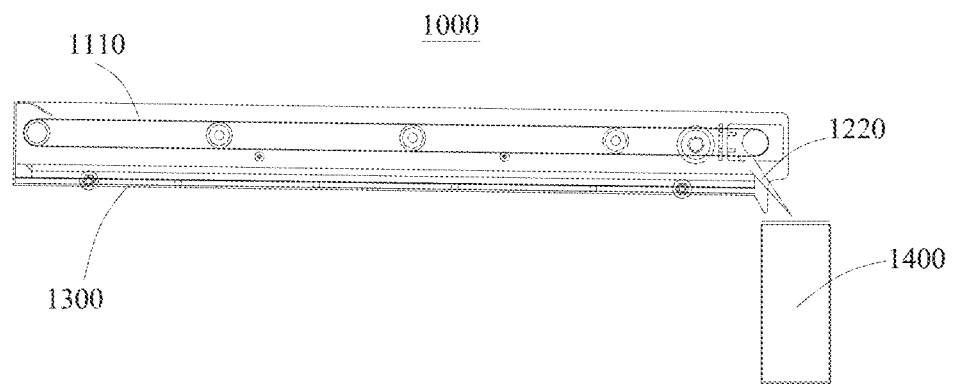
FIG. 19 is a structural diagram of a second embodiment of the mask residue separation device according to the present disclosure.

The cleaning apparatus may have a variety of configurations, such as the two configurations as shown in FIG. 13 and FIG. 19.

As shown in FIG. 13, the cleaning apparatus includes a purger 1210. The purger 1210 is adjacent to the second transmission shaft 1130 and faces the lower surface of the conveyor belt 1110 located below the second transmission shaft 1130 to blow off the fifth substance on the upper surface of the conveyor belt 1110 to the mask residue collector 1400. The purger 1210 is arranged in an inter-belt transverse gap between the upper conveyor belt 1112 and the lower conveyor belt 1113.

As shown in FIG. 13, the purger 1210 is located in a region encircled by the inner surface of the conveyor belt 1110 and adjacent to the second transmission shaft 1130, and blows gas towards the conveyor belt 1110 located below the second transmission shaft 1130 and towards the mask residue collector 1400. The gas is blown out from a lower surface of the lower conveyor belt 1113 to an upper surface of the lower conveyor belt 1113, so as to blow the fifth substance located on the upper surface of the lower conveyor belt 1113 to the mask residue collector 1400, thereby cleaning the conveyor belt 1110. The upper conveyor belt 1112 performs primary filtering on the first substance, and the lower conveyor belt 1113 performs secondary filtering on the first substance. During the secondary filtering, the fifth substance may also be adhered to the lower surface of the lower conveyor belt 1113. In this embodiment, the purger 1210 is located in the region encircled by the inner surface of the conveyor belt 1110 and makes the gas to be blown out through the lower surface of the lower conveyor belt 1113 to the upper surface of the lower conveyor belt 1113, which can blow away the fifth substance adhered to the surface of the lower conveyor belt 1113, thereby further improving cleanliness and the filtering effect of the conveyor belt 1110.

Optionally, the purger 1210 includes a purge tube 1211 arranged in a longitudinal direction, the purge tube 1211 is provided with a blowing port along an axial direction, and gas is blown out through the blowing port.

As shown in FIGS. 16a and 16b, the longitudinal direction is a width direction of the conveyor belt 1110, and the purge tube 1211 may purge an entire width region of the conveyor belt 1110 to prevent clogging of the first filter screen of the conveyor belt 1110. The purge tube 1211 may alternatively be an ion air duct to blow out plasma flow and reduce static electricity. The blowing port may have a configuration of an elongated blowing slit 1211a as shown in FIG. 16a, or may have a configuration of a plurality of blowing holes 1211b as shown in FIG. 16b.

As shown in FIG. 19, the cleaning apparatus includes a scraper 1220. The scraper 1220 abuts against the upper surface of the conveyor belt 1110 located at the end or below the second transmission shaft 1130 to scrape the fifth substance on the upper surface of the conveyor belt 1110 to the mask residue collector 1400.

The scraper 1220 may be made of a rubber or silicone material. The scraper 1220 has one end in contact with the first filter screen of the conveyor belt 1110 to scrape the fifth substance on the first filter screen and the other end facing the mask residue collector 1400, so as to transfer the fifth substance to the mask residue collector 1400.

It is to be noted that the above are merely optional examples. The cleaning apparatus may alternatively be a water spraying apparatus, and the first filter screen of the conveyor belt 1110 is flushed with water through the water spraying apparatus. That is, any apparatus that can clean the conveyor belt 1110 should be understood to be within the scope of the present disclosure.

In a preferred embodiment, the cleaning apparatus includes at least two of the purger 1210, the scraper 1220, and the water spraying apparatus to realize secondary or multiple cleaning and improve the cleaning effect.

According to some embodiments of the present disclosure, the mask residue separation device 1000 further includes a second filter screen 1300. The second filter screen 1300 is arranged below the conveyor belt 1110 to receive the sixth substance from the conveyor belt 1110. The sixth substance is a substance penetrating the conveyor belt 1110 after the first substance is filtered by the conveyor belt 1110.

That is, the sixth substance and the fifth substance (the fifth substance is from a substance adhered to and then falling off the lower conveyor belt 1113) are filtered through the second filter screen 1300, so that the mask residue is further separated, and the substance filtered by the second filter screen 1300 includes less mask residue, which is more conducive to the reuse of the cleaner. Therefore, the filtering effect can be further improved.

Further, a mesh number of the first filter screen is 50 to 150, and a mesh number of the second filter screen 1300 is 70 to 200.

The first filter screen may have 60 meshes, 80 meshes, 100 meshes, 120 meshes, or the like, and the second filter screen 1300 may have 80 meshes, 100 meshes, 130 meshes, 150 meshes, 180 meshes, or the like.

Optionally, the mesh number of the second filter screen 1300 is greater than the mesh number of the first filter screen, thereby realizing finer filtration.

Figure 17:
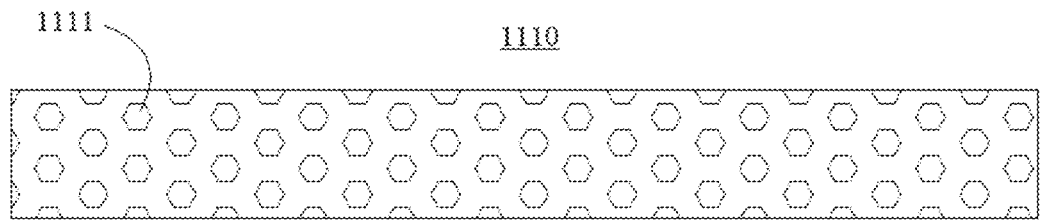
FIG. 17 is a top view of an embodiment of the conveyor belt according to the present disclosure.
Figure 18:
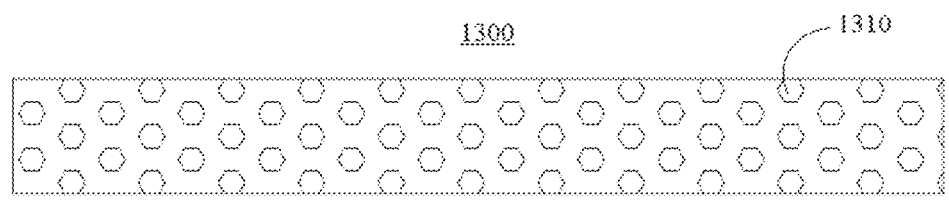
FIG. 18 is a top view of an embodiment of a second filter screen according to the present disclosure.

As shown in FIG. 17 and FIG. 18, the mesh number of the first filter screen is smaller, that is, a first filtering hole 1111 of the first filter screen is larger, so larger substances can pass, and the first filtering hole 1111 is not easily clogged. The mesh number of the second filter screen is larger, so a second filtering hole 1310 is smaller, and finer filtration can be realized.

Figure 20:
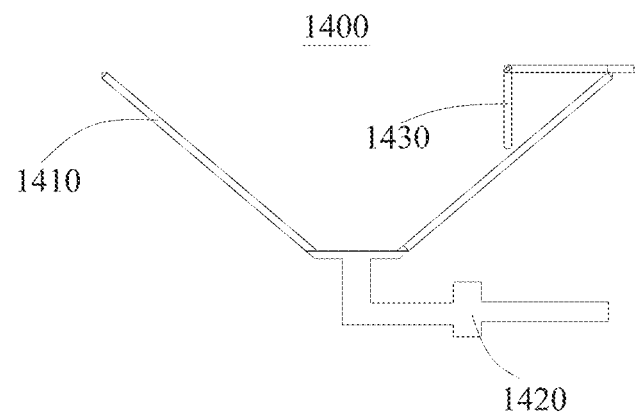
FIG. 20 is a structural diagram of a mask residue collector according to an embodiment of the present disclosure.

According to some embodiments of the present disclosure, as shown in FIG. 20, the mask residue collector 1400 includes a tank body 1410 and a pump 1420. The fifth substance is received through the tank body 1410. The pump 1420 is communicated with the tank body 1410 to pump the fifth substance in the tank body 1410.

The fifth substance is received through the tank body 1410, so as to realize collection of the fifth substance including the mask residue. The pump 1420 pumps the fifth substance, preventing pollution caused by overflowing of the fifth substance due to excessive deposition in the tank body 1410.

Further, the mask residue collector 1400 further includes a liquid-level sensor 1430 and a controller. The liquid-level sensor 1430 is arranged in the tank body 1410 to detect a liquid level of the fifth substance in the tank body 1410. The controller connects the liquid-level sensor 1430 and the pump 1420 to control the pump 1420 to pump the fifth substance when the liquid level of the fifth substance detected by the liquid-level sensor 1430 reaches a predetermined liquid level.

The liquid level of the fifth substance in the tank body 1410 is sensed through the liquid-level sensor 1430, and a height of the fifth substance in the tank body 1410 can be clearly known. When the fifth substance in the tank body 1410 reaches the predetermined liquid level, the controller controls the pump 1420 to pump the fifth substance in the tank body 1410 in a timely manner. Therefore, automatic pumping of the fifth substance can be realized, which is highly efficient and saves manpower.

Further, a side wall of the tank body 1410 is inclined towards a center of the bottom of the tank body 1410, and the liquid-level sensor 1430 includes a first electrode, a second electrode, and a conduction detecting apparatus. The first electrode and the second electrode are spaced apart in the tank body 1410 and are at a predetermined height from the bottom of the tank body 1410. The predetermined height corresponds to the predetermined liquid level. The conduction detecting apparatus detects whether a conduction between the first electrode and the second electrode is achieved.

The first electrode and the second electrode are arranged at the predetermined liquid level, and the liquid level is sensed through the first electrode and the second electrode. The first electrode and the second electrode may be metal sheets. The conduction detecting apparatus may test resistance between the first electrode and the second electrode. That is, the fifth substance is accumulated to a position that can be in contact with the first electrode and the second electrode. Since the fifth substance includes a liquid component, the resistance may decrease. Based on a difference in resistance between the first electrode and the second electrode in contact with the fifth substance and not in contact with the fifth substance, it is determined that the fifth substance reaches a liquid level in the tank 1410 in contact with the first electrode and the second electrode. The conduction detecting apparatus may test a current between the first electrode and the second electrode. That is, the fifth substance is accumulated to a position that can be in contact with the first electrode and the second electrode. Since the fifth substance includes a liquid component, a current may be generated when a certain voltage is applied between the first electrode and the second electrode. When the current is tested, it is determined that the fifth substance reaches a liquid level in contact with the first electrode and the second electrode.

Heights of the first electrode and the second electrode from the bottom of the tank body may be the same or different. If the heights are different, the height of the electrode higher from the bottom of the tank is taken as the predetermined height.

In comparison, the liquid-level sensor 1430 which is a pulse liquid-level sensor 1430, an ultrasonic liquid-level sensor 1430, or an infrared liquid-level sensor 1430 is more likely to fail when polluted by the fifth substance. The liquid-level sensor 1430, even if polluted by the fifth substance, can still accurately detect the liquid level without affecting the determination of the conduction between the first electrode and the second electrode, thereby preventing failure and having higher stability.

It is to be noted that the above are merely optional examples. The pulse liquid-level sensor 1430, the ultrasonic liquid-level sensor 1430, or the infrared liquid-level sensor 1430 may alternatively be protected according to an actual requirement to prevent pollution by the fifth substance, so that the pulse liquid-level sensor 1430, the ultrasonic liquid-level sensor 1430, or the infrared liquid-level sensor 1430 is selected, all of which should be understood to be within the scope of the present disclosure.

Figure 21:
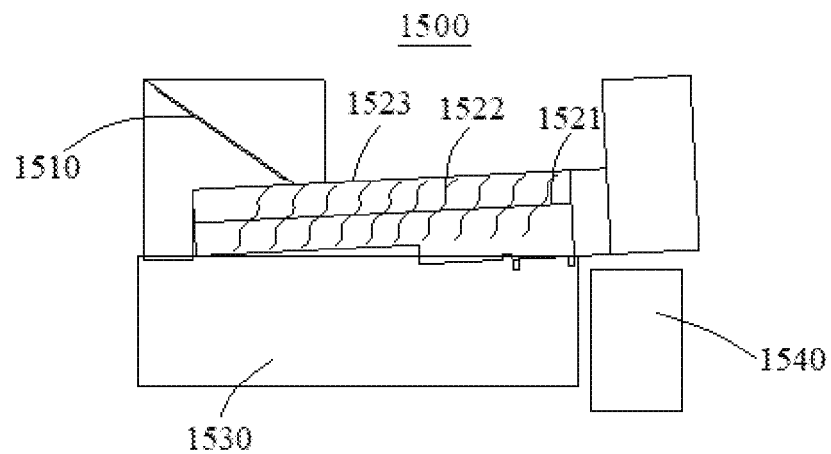
FIG. 21 is a structural diagram of a mask residue dehydrator according to an embodiment of the present disclosure.

In some embodiments of the present disclosure, as shown in FIG. 21, the mask residue separation device 1000 further includes a mask residue dehydrator 1500. The mask residue dehydrator 1500 includes an extruder or a centrifuge, a mask residue collection box 1540, and a sewage box 1530. The extruder receives the fifth substance pumped by the pump 1420 and extrudes the fifth substance, and the centrifuge receives the fifth substance pumped by the pump 1420 and centrifugally rotates the fifth substance. The mask residue collection box 1540 butts the extruder or the centrifuge to receive the seventh substance. The seventh substance is a substance remaining after the fifth substance is extruded by the extruder or centrifugally rotated by the centrifuge. The sewage box 1530 is communicated with the extruder to receive the eighth substance. The eighth substance is a substance discharged after the fifth substance is extruded by the extruder or is centrifugally rotated by the centrifuge.

As shown in FIG. 21, the mask residue dehydrator 1500 includes an extruder, a mask residue collection box 1540, and a sewage box 1530. The extruder extrudes the fifth substance pumped by the pump 1420, so as to extrude the eighth substance (mainly a liquid component) in the fifth substance to the sewage box 1530 and cause the seventh substance (mainly dry mask residue) in the fifth substance to fall into the mask residue collection box 1540.

The mask residue dehydrator 1500 may alternatively include a centrifuge, a mask residue collection box 1540, and a sewage box 1530. The centrifuge centrifugally rotates the fifth substance pumped by the pump 1420. The centrifuge may include a centrifugal barrel and a driver. Liquid outlets are distributed on a wall and/or the bottom of the barrel body. The driver drives the centrifugal barrel to rotate, the centrifugal barrel drives the fifth substance to rotate, the eighth substance (mainly the liquid component) is thrown out and flows to the sewage box 1530 through the liquid outlet, and the seventh material (mainly the dry mask residue) remains in the centrifugal barrel. The centrifugal barrel is the mask residue collection box 1540.

It is to be noted that the above are merely optional examples. The fifth substance is dried and dehydrated through a drier. That is, any apparatus that can dehydrate the fifth substance should be understood to be within the scope of the present disclosure.

Further, the extruder is a screw conveyor extruder. The screw conveyor extruder includes: an extrusion cavity 1523, a screw 1521, spiral blades 1522, and a rotating mechanism. The fifth substance is received through the extrusion cavity 1523. The screw 1521 is connected to two ends of the extrusion cavity 1523. The spiral blades 1522 are arranged around the screw 1521 and located in the extrusion cavity 1523. The rotating mechanism is connected to the screw 1521 to rotate the screw 1521 to drive the spiral blades 1522 to rotate, thereby extruding and conveying the fifth substance through the spiral blades 1522.

As shown in FIG. 21, the extrusion cavity 1523 accommodates the fifth substance, the mask residue collection box 1540 is arranged below a discharge end of the extrusion cavity 1523, the rotating mechanism drives the screw 1521 to rotate, the screw 1521 rotates to drive the spiral blades 1522 to rotate, and the spiral blades 1522 extrudes the fifth substance, so as to discharge the eighth substance from the extrusion cavity 1523 and convey the seventh substance to the discharge end of the extrusion cavity 1523, thereby falling to the mask residue collection box 1540. Therefore, the fifth substance can be easily extruded and conveyed.

In some embodiments of the present disclosure, the mask residue dehydrator 1500 further includes a third filter screen 1510 and a vibrator. The third filter screen 1510 is arranged obliquely, and the third filter screen 1510 receives the fifth substance pumped by the pump 1420 through the third filter screen 1510 and transfers the fifth substance into the extruder or the centrifuge. The vibrator is connected to the third filter screen 1510 to vibrate the third filter screen 1510.

Figure 22:
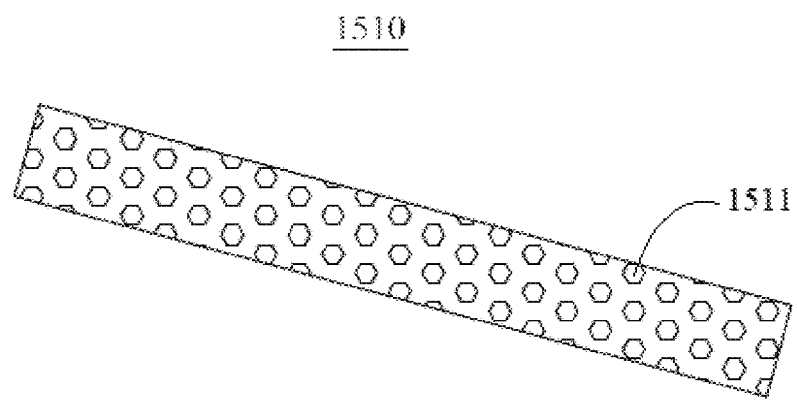
FIG. 22 is a structural diagram of a third filter screen according to an embodiment of the present disclosure.

The fifth substance pumped by the pump 1420 slides from the third filter screen 1510 to the extruder or centrifuge. The third filter screen 1510 arranged obliquely can reduce resistance of the fifth substance to slide. As shown in FIG. 22, the third filter screen includes third filtering holes 1511. The fifth substance can also be filtered by the third filter screen 1510, thereby reducing the liquid component in the fifth substance. The third filter screen 1510 is vibrated by the vibrator, which can speed up the sliding of the fifth substance to the extruder or centrifuge, prevent accumulation of the fifth substance on the third filter screen 1510, and also facilitate penetration of the liquid component in the fifth substance into the third filter screen 1510 during the vibration.

Further, the vibrator is a pneumatic vibrator, which can stably vibrate the third filter screen 1510 and has a long service life.

It is to be noted that the vibration may alternatively be an electromagnetic vibrator, all of which should be understood to be within the scope of the present disclosure. A cleaning method according to the present disclosure is described below.

Figure 24:
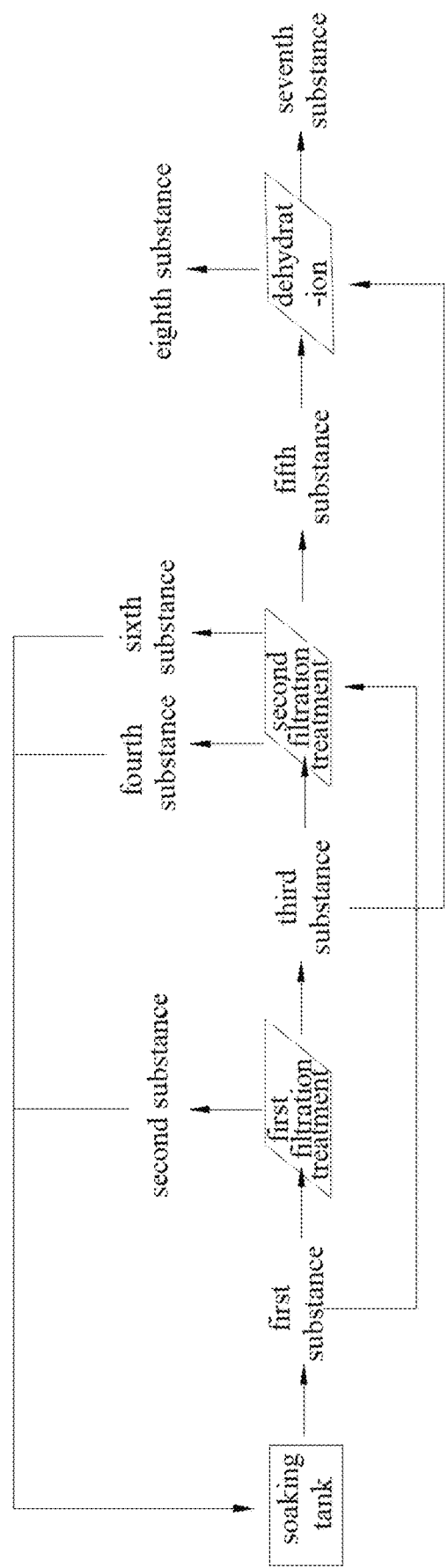
FIG. 24 is a schematic diagram of an embodiment of a cleaning method according to the present disclosure.

As shown in FIG. 24, the cleaning method includes the following steps.

Step S1, providing a solar cell, wherein the solar cell is a solar cell with a mask attached.

Step S2, immersing the solar cell into cleaner in a soaking tank to remove the mask attached to the solar cell.

Step S3, spaying liquid or gas towards the bottom of the soaking tank to flush up mask residue deposited on the bottom of the soaking tank and suck out a first substance flushed up from the bottom of the soaking tank.

The solar cell is immersed in the cleaner to remove the mask to realize immersive cleaning, which, compared with sprayed cleaning, enables the mask on the solar cell to gradually soften and fully react with the cleaner, thereby decomposing and peeling off the mask from the solar cell, and can efficiently and thoroughly remove the mask on the surface of the solar cell.

During mask residue adsorption at the bottom of the soaking tank, since a sucking range is limited, not all the mask residue at the bottom of the soaking tank can be sucked in a wide range. Moreover, the mask residue is attached to the bottom of the soaking tank and has adhesion to the bottom of the soaking tank, making the sucking more difficult.

In order to more comprehensively suck the mask residue falling on the bottom of the soaking tank, the liquid or gas is sprayed towards the bottom of the soaking tank to form a flushing force on the mask residue to peel off the mask residue from the bottom of the soaking tank, thereby widen a mask residue sucking range and improving a sucking capability of the mask residue.

In some embodiments of the present disclosure, the cleaning method further includes: subjecting the first substance sucked out to a first filtration treatment to obtain a second substance as filtrate and a third substance as a filter residue respectively, and making the second substance to flow back into the soaking tank. The first filtration is performed on the first substance including the mask residue, and the second substance with a higher proportion of the cleaner flows back into the soaking tank, thereby reducing the content of the mask residue in the soaking tank and replenishing the cleaner in the soaking tank, which prevents a waste of the cleaner due to the filtration.

Further, the cleaning method further includes: subjecting the third substance to a second filtration treatment to obtain a fourth substance as filtrate and a fifth substance as a filter residue respectively, and making the fourth substance to flow back into the soaking tank. The second filtration is performed on the third substance with a higher proportion of the mask residue, and the fourth substance with a higher proportion of the cleaner flows back into the soaking tank, which can replenish the cleaner in the soaking tank, thereby further preventing the waste of the cleaner due to the filtration.

In some embodiments of the present disclosure, the cleaning method further includes: discharging the first substance in the soaking tank, which is subjected to a second filtration treatment to obtain a sixth substance as filtrate and a fifth substance as a filter residue respectively, and making the sixth substance to flow back into the soaking tank. The sixth substance with a higher proportion of the cleaner flows back into the soaking tank, which can replenish the cleaner in the soaking tank, thereby further preventing the waste of the cleaner due to the filtration.

In some embodiments of the present disclosure, the cleaning method further includes any one of the following steps or a combination thereof:
(1) subjecting the first substance sucked out to a first filtration treatment to obtain a second substance as filtrate and a third substance as a filter residue respectively, and making the second substance to flow back into the soaking tank as the liquid sprayed towards the bottom of the soaking tank;
(2) subjecting the first substance sucked out to a first filtration treatment to obtain a second substance as filtrate and a third substance as a filter residue respectively, subjecting the third substance to a second filtration treatment to obtain a fourth substance as filtrate and a fifth substance as a filter residue respectively, and making the fourth substance to flow back into the soaking tank as the liquid sprayed towards the bottom of the soaking tank; and
(3) discharging the first substance in the soaking tank, which is subjected to a second filtration treatment to obtain a sixth substance as filtrate and a fifth substance as a filter residue respectively, and making the sixth substance to flow back into the soaking tank as the liquid sprayed towards the bottom of the soaking tank.

The first substance is filtered in the three steps, and the substance (the filtrate) with a higher proportion of the cleaner after the filtering flows back into the soaking tank, which prevents excessive waste of the cleaner due to the filtering. Moreover, a selection may be made according to a filtering accuracy requirement. For example, filtering accuracy of the first filtration treatment and the second filtration treatment may be the same or different. The filtering accuracy may be coarse filtration and fine filtration when being different. The coarse filtration may replenish the cleaner in the soaking tank more efficiently, but the filtrate includes more impurities. The fine filtration may obtain filtrate with fewer impurities, but the replenishing of the cleaner into the soaking tank is inefficient.

In some embodiments of the present disclosure, the cleaning method further includes: dehydrating the third substance and/or the fifth substance.

Through the dehydrating, the third substance and/or the fifth substance may be converted from a wet film state to a dry film state. Waste treatment costs of the mask residue in the dry film state are lower, thereby saving the costs.

In some embodiments of the present disclosure, in step S2, the cleaner is sprayed onto the solar cell immersed in the cleaner.

On the basis of the immersive cleaning, the cleaner is sprayed to form a flushing force on the mask on the surface of the solar cell, which speeds up the removal of the mask on the surface of the solar cell.

In some embodiments of the present disclosure, the cleaning method further includes any one of the following steps or a combination thereof:
(1) subjecting the first substance sucked out to a first filtration treatment to obtain a second substance as filtrate and a third substance as a filter residue respectively, and making the second substance to flow back into the soaking tank as the cleaner sprayed onto the solar cell immersed in the cleaner;
(2) subjecting the first substance sucked out to a first filtration treatment to obtain a second substance as filtrate and a third substance as a filter residue respectively, subjecting the third substance to a second filtration treatment to obtain a fourth substance as filtrate and a fifth substance as a filter residue respectively, and making the fourth substance to flow back into the soaking tank as the cleaner sprayed onto the solar cell immersed in the cleaner; and
(3) discharging the first substance in the soaking tank, which is subjected to a second filtration treatment to obtain a sixth substance as filtrate and a fifth substance as a filter residue respectively, and making the sixth substance to flow back into the soaking tank as the cleaner sprayed onto the solar cell immersed in the cleaner.

The first substance is filtered in the three steps, and the substance (the filtrate) with a higher proportion of the cleaner after the filtering flows back into the soaking tank, which prevents excessive waste of the cleaner due to the filtering. Moreover, a selection may be made according to a filtering accuracy requirement. For example, filtering accuracy of the first filtration treatment and the second filtration treatment may be the same or different. The filtering accuracy may be coarse filtration and fine filtration when being different. The coarse filtration may replenish the cleaner in the soaking tank more efficiently, but the filtrate includes more impurities. The fine filtration may obtain filtrate with fewer impurities, but the replenishing of the cleaner into the soaking tank is inefficient.

In some embodiments of the present disclosure, the cleaning method further includes the following steps:

(1) subjecting the first substance sucked out to a first filtration treatment to obtain a second substance as filtrate and a third substance as a filter residue respectively, and making the second substance to flow back into the soaking tank as the cleaner sprayed onto the solar cell immersed in the cleaner;

(2) subjecting the first substance sucked out to a first filtration treatment to obtain a second substance as filtrate and a third substance as a filter residue respectively, subjecting the third substance to a second filtration treatment to obtain a fourth substance as filtrate and a fifth substance as a filter residue respectively, and making the fourth substance to flow back into the soaking tank as the liquid sprayed towards the bottom of the soaking tank; and (3) discharging the first substance in the soaking tank, which is subjected to a second filtration treatment to obtain a sixth substance as filtrate and a fifth substance as a filter residue respectively, and making the sixth substance to flow back into the soaking tank as the liquid sprayed towards the bottom of the soaking tank.

The first filtration treatment is fine filtration, and the second filtration treatment is coarse filtration.

The filtrate with different impurity content flows back into the soaking tank for classification and use. That is, the second substance with lower impurity content flows back into the soaking tank as the cleaner sprayed onto the solar cell immersed in the cleaner, and the fourth substance and the sixth substance with higher impurity content flow back into the soaking tank as the liquid sprayed towards the bottom of the soaking tank, which improves a utilization effect of reflux liquid in the soaking tank.

In some embodiments of the present disclosure, in combination with the cleaning device and the cleaning system in the foregoing embodiments, the filtering device and/or the mask residue separation device 1000 may be used for the first filtration treatment, the filtering device and/or the mask residue separation device 1000 may be used for the second filtration treatment, and the third substance and/or the fifth substance may be dehydrated by using the mask residue dehydrator 1500 in the mask residue separation device 1000. For example, the filtering device may be used for the first filtration treatment, and the mask residue separation device 1000 may be used for the second filtration treatment.

The above merely describes preferred embodiments of the present disclosure and is not intended to limit the present disclosure. Any amendment, equivalent replacement, improvement, and the like made within the spirit and principle of the present disclosure should fall within the protection scope of the present disclosure.

What is claimed is:

1. A cleaning system, comprising:
 a cleaning device, comprising a soaking tank configured to accommodate a cleaner;
 a filtering system configured to filter a first substance; and
 a mask residue separation device;
 wherein the first substance is a mixture of the cleaner and a mask residue in the soaking tank, and
 wherein the filtering system comprising:
  a sucking apparatus, comprising a sucking port for sucking the first substance;
  a spraying apparatus, comprising a spraying port, the spraying port being oriented toward a region that the sucking pot is capable of sucking in a bottom of the soaking tank, and the spraying port configured to spray liquid to flush the bottom of the soaking tank;
  a filtering apparatus, connected to the sucking apparatus to receive and filter the first substance sucked by the sucking port, wherein the filtering apparatus comprising a cleaner filter configured to filter the first substance, wherein the cleaner filter comprises a barrel body configured to accommodate the first substance and a filter element arranged in the barrel body;
  a third pipeline, the mask residue separation device connected to the third pipeline, wherein the mask residue separation device is configured to separate the cleaner and the mask residue in a third substance, the third substance being a residue of the first substance, wherein the residue is blocked by the filter element of the cleaner filter; and
  a fourth pipeline having a first end communicated with the mask residue separation device and a second end connected to the spraying port to transfer a fourth substance into the spraying port, the fourth substance being a substance of which main component is the cleaner after the third substance is separated by the mask residue separation device.

2. The cleaning system of claim 1, wherein,
 the sucking port is arranged above the bottom of the soaking tank and oriented toward the bottom of the soaking tank, and the spraying port is arranged above the bottom of the soaking tank and adjacent to the bottom of the soaking tank.

3. The cleaning system of claim 1, wherein the sucking apparatus comprises a plurality of sucking port groups spaced apart, and the spraying apparatus comprises a plurality of spraying port groups, each of the plurality of sucking port groups arranged adjacent to a corresponding one of the plurality of spraying port groups, each of the plurality of sucking port groups comprises one sucking port, each of the plurality of spraying port groups comprises two spraying ports, and the two spraying ports of a given spraying port group are arranged on two sides of the one sucking port of the sucking port group corresponding to the given spraying port group; or each of the plurality of sucking port groups comprises one sucking port, each of the plurality of spraying ports groups comprises three or four spraying ports, and the three or four spraying ports of a given spraying port group are arranged around the one sucking port of the sucking port group corresponding to the given spraying port group.

4. The cleaning system of claim 1, wherein the filtering apparatus comprises:
 a first pipeline, communicated with the sucking apparatus, wherein the cleaner filter is connected to the first pipeline to filter the first substance, and wherein the cleaner filter receives the first substance from the first pipeline.

5. The cleaning system of claim 4, wherein the filtering apparatus further comprises:
a second pipeline having a first end communicated with the cleaner filter to output a second substance passing through the cleaner filter, the second substance being a substance obtained after the first substance is filtered by the cleaner filter, and a second end of the second pipeline being communicated with the spraying apparatus; and/or
the filtering apparatus comprises a plurality of cleaner filters, the plurality of cleaner filters are sequentially connected to sequentially filter the first substance from the first pipeline, and a filter pore size of a downstream cleaner filter of the plurality of cleaner filters is smaller than a filter pore size of an upstream cleaner filter of the plurality of cleaner filters.

6. The cleaning system of claim 4, wherein the cleaner filter comprises:
a feed port formed on an upper portion of the barrel body; and
a discharge port formed on a lower portion of the barrel body,
wherein the first substance from the first pipeline is received through the feed port,
wherein the filter element of the cleaner filter is formed as a hollow cylinder shape,
wherein the first substance flows from the feed port into a hollow region of the filter element and flows out to the discharge port through the filter element, and
wherein a second pipeline is supplied with a second substance through the discharge port.

7. The cleaning system of claim 6, wherein the cleaner filter further comprises:
a barrel cover, covering a top of the barrel body, and an exhaust port formed on a top of the barrel cover;
a cleaning paddle, passing through a middle of the barrel cover and accommodated in the hollow region, the cleaning paddle being in contact with an inner wall of the filter element;
a driving mechanism, arranged on the barrel cover and connected to the cleaning paddle to drive the cleaning paddle to rotate, to cause the first substance accommodated in the barrel body to flow downwards; and
a controller, connected to the driving mechanism to control the driving mechanism to rotate the cleaning paddle.

8. The cleaning system of claim 7, wherein the cleaning paddle comprises:
a rotating shaft, arranged vertically and having a top end connected to the driving mechanism; and
blades, arranged around the rotating shaft and surrounding the rotating shaft, and the blades comprising scrapers or brushes.

9. The cleaning system of claim 7, wherein a first drain outlet is formed at a bottom of the barrel body,
wherein the filtering system further comprises a first drain valve connected to the first drain outlet, the third substance being discharged when the first drain valve is opened.

10. The cleaning system of claim 9, wherein the cleaner filter has operating modes including a first mode and a second mode, the controller is further connected to the first drain valve and switches the first mode and the second mode based on a predetermined condition; in the first mode, the controller is configured to control the driving mechanism to drive the cleaning paddle to rotate and closes the first drain valve, and in the second mode, the controller is configured to control the driving mechanism to drive the cleaning paddle to rotate and opens the first drain valve.

11. The cleaning system of claim 9, wherein a second drain outlet spaced apart from the first drain outlet is arranged at the bottom of the barrel body, and the filtering system further comprises a second drain valve connected to the second drain outlet.

12. The cleaning system of claim 1, wherein the mask residue separation device comprises:
a first transmission shaft;
a second transmission shaft, the first transmission shaft and the second transmission shaft being transversely spaced apart;
a conveyor belt, encircling the first transmission shaft and the second transmission shaft, the conveyor belt being capable of reciprocating around the first transmission shaft and the second transmission shaft, the conveyor belt being formed as a first filter screen, and the conveyor belt receiving the first third substance flowing in from thereabove; and
a mask residue collector, arranged corresponding to a discharge end of the conveyor belt to receive a fifth substance transferred by the discharge end of the conveyor belt, the fifth substance being a substance remaining on the conveyor belt after the first third substance is filtered by the conveyor belt.

13. The cleaning system of claim 12, wherein the mask residue separation device further comprises:
a cleaning apparatus, adjacent to the discharge end of the conveyor belt to sweep the fifth substance on the conveyor belt to the mask residue collector.

14. The cleaning system of claim 13, wherein the cleaning apparatus comprises:
a purger, adjacent to the second transmission shaft and oriented toward a lower surface of the conveyor belt to blow off the fifth substance on a surface of the conveyor belt to the mask residue collector, and the second transmission shaft being adjacent to the discharge end of the conveyor belt; wherein the purger comprises a purge tube arranged in a longitudinal direction, the purge tube is provided with a blowing port along an axial direction to blow out gas; or
wherein the cleaning apparatus comprises:
a scraper, abutting against a surface of the conveyor belt to scrape the fifth substance on a surface of the conveyor belt to the mask residue collector, and the second transmission shaft being adjacent to the discharge end of the conveyor belt.

15. The cleaning system of claim 12, wherein,
the mask residue separation device further comprises:
a second filter screen, arranged below the conveyor belt to receive the fifth substance from the conveyor belt.

16. The cleaning system of claim 1, wherein the cleaning device further comprises:
a liquid blocking mechanism, fitting an inlet of the soaking tank, a height of the cleaner that the soaking tank is capable of accommodating being higher than a predetermined gap,
wherein the liquid blocking mechanism comprises an openable and closable liquid blocking member,
wherein the openable and closable liquid blocking member is opened when a solar cell passes through the inlet to allow the solar cell to enter the soaking tank through the inlet, wherein the openable and closable liquid blocking member is closed to seal the inlet when no solar cell passes through the inlet, wherein the liquid blocking mechanism comprises a liquid-blocking roller assembly comprising an upper liquid-blocking roller and a lower liquid-blocking roller abutting against each other up and down, the upper liquid-blocking roller configured to move up and down, and/or the lower liquid-blocking roller configured to move up and down, and wherein the solar cell is capable of entering the soaking tank through abutting portions of the upper liquid-blocking roller and the lower liquid-blocking roller which are capable of abutting against each other.

17. A cleaning method using the cleaning system of claim 1, comprising:

step S1: providing a solar cell with a mask attached;

step S2: immersing the solar cell into cleaner in the soaking tank to remove the mask attached to the solar cell; and step S3: spraying liquid towards the bottom of the soaking tank to flush up mask residue deposited on the bottom of the soaking tank and sucking out the first substance, wherein the first substance was flushed up from the bottom of the soaking tank.

18. The cleaning method of claim 17, wherein the first substance sucked out is subjected to a first filtration treatment to obtain a second substance as filtrate and a third substance as a filter residue, respectively, and wherein the second substance flows back into the soaking tank.

19. The cleaning method of claim 17, wherein the cleaning method further comprises:

subjecting the first substance sucked out to a first filtration treatment to obtain filtrate as a second substance and filter residue as a third substance, respectively; and flowing the second substance back into the soaking tank and spraying the second substance towards the bottom of the soaking tank.

20. The cleaning system of claim 1, wherein the cleaning system further comprises:

a plurality of sucking ports, wherein several of the plurality of sucking ports are arranged above the bottom of the soaking tank and oriented toward the bottom of the soaking tank and the other of the plurality of sucking ports are connected to the bottom of the soaking tank; or a plurality of sucking ports, wherein all of the plurality of sucking ports are arranged above the bottom of the soaking tank and oriented toward the bottom of the soaking tank or all of the plurality of sucking ports are connected to the bottom of the soaking tank; or an arrangement of the spraying port, wherein the spraying port is arranged above the bottom of the soaking tank and adjacent to the bottom of the soaking tank, and the spraying port is located on a side of the sucking port and at a predetermined distance from the sucking port; or a plurality of spraying port groups corresponding to a plurality of sucking port groups, wherein each of the plurality of sucking port groups comprises at least one sucking port, and each of the plurality of spraying port groups comprises at least one spraying port.

\* \* \* \* \*